US012377650B2

(12) United States Patent
Shiozawa et al.

(10) Patent No.: US 12,377,650 B2
(45) Date of Patent: Aug. 5, 2025

(54) LIQUID EJECTING APPARATUS

(71) Applicant: SEIKO EPSON CORPORATION, Tokyo (JP)

(72) Inventors: Yu Shiozawa, Shiojiri (JP); Masaki Mori, Shiojiri (JP); Motoki Takabe, Shiojiri (JP); Hitoshi Takaai, Azumino (JP); Eiju Hirai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 107 days.

(21) Appl. No.: 18/063,275

(22) Filed: Dec. 8, 2022

(65) Prior Publication Data

US 2023/0182465 A1 Jun. 15, 2023

(30) Foreign Application Priority Data

Dec. 9, 2021 (JP) ................................ 2021-199904

(51) Int. Cl.
*B41J 2/45* (2006.01)
*B41J 2/045* (2006.01)
*B41J 2/14* (2006.01)

(52) U.S. Cl.
CPC ....... *B41J 2/04536* (2013.01); *B41J 2/04513* (2013.01); *B41J 2/04541* (2013.01); *B41J 2/04563* (2013.01); *B41J 2/04581* (2013.01); *B41J 2/04588* (2013.01); *B41J 2/14233* (2013.01)

(58) Field of Classification Search
CPC .................................................... B41J 2/04588
See application file for complete search history.

(56) References Cited

U.S. PATENT DOCUMENTS

2002/0145637 A1* 10/2002 Umeda ................ B41J 2/04581 347/9
2005/0088468 A1* 4/2005 Clark ................... B41J 2/04516 347/11
2009/0322816 A1* 12/2009 Ihara ........................ B41J 2/072 347/17
2015/0281019 A1 10/2015 Hashizume
2017/0136767 A1* 5/2017 Sano .................... B41J 2/04563
2020/0055315 A1* 2/2020 Matsubara ........... B41J 2/14209

FOREIGN PATENT DOCUMENTS

JP 2001138498 A * 5/2001
JP 2009-026787 A 2/2009
JP 2010194834 9/2010
JP 2015187822 10/2015

OTHER PUBLICATIONS

Machine generated English translation of JP2001138498A to Otsuki, “Method for Driving Head of Ink-Jet Recording Apparatus, Ink-Jet Recording Apparatus, and Recording Medium”; retrieved via espacenet.com on Nov. 14, 2024; 23pp.*

* cited by examiner

*Primary Examiner* — Shelby L Fidler
(74) *Attorney, Agent, or Firm* — WORKMAN NYDEGGER

(57) ABSTRACT

The controller drives the piezoelectric body such that, when the cumulative number of times of the driving is a second number of times greater than the first number of times, the voltage difference is a second value smaller than the first value.

10 Claims, 13 Drawing Sheets

FIG. 13

622A

| TEMPERATURE [°C] \ CUMULATIVE NUMBER OF TIMES OF DRIVING [100 MILLION TIMES] | 0 TO LESS THAN 1 | 1 TO LESS THAN 10 | 10 TO LESS THAN 50 | 50 TO LESS THAN 70 | 70 TO LESS THAN 100 | 100 OR MORE |
|---|---|---|---|---|---|---|
| NOT HIGHER THAN 30 | 0 | −0.02 | −0.04 | −0.1 | −0.16 | −0.18 |
| BETWEEN 30 AND 50 | 0 | −0.04 | −0.06 | −0.14 | −0.2 | −0.22 |
| NOT LOWER THAN 50 | 0 | −0.06 | −0.08 | −0.18 | −0.24 | −0.26 |

FIG. 15

622B

| TEMPERATURE [°C] \ CUMULATIVE NUMBER OF TIMES OF DRIVING [100 MILLION TIMES] | 0 TO LESS THAN 1 | 1 TO LESS THAN 10 | 10 TO LESS THAN 50 | 50 TO LESS THAN 70 | 70 TO LESS THAN 100 | 100 OR MORE |
|---|---|---|---|---|---|---|
| NOT HIGHER THAN 30 | 0 | 0.02 | 0.04 | 0.1 | 0.16 | 0.18 |
| BETWEEN 30 AND 50 | 0 | 0.04 | 0.06 | 0.14 | 0.2 | 0.22 |
| NOT LOWER THAN 50 | 0 | 0.06 | 0.08 | 0.18 | 0.24 | 0.26 |

LIQUID EJECTING APPARATUS

The present application is based on, and claims priority from JP Application Serial Number 2021-199904, filed Dec. 9, 2021, the disclosure of which is hereby incorporated by reference herein in its entirety.

BACKGROUND

1. Technical Field

The present disclosure relates to a liquid ejecting apparatus.

2. Related Art

In a liquid ejecting apparatus having a piezoelectric element, the amount of deformation of the piezoelectric element may vary depending on the number of drive pulses applied to the piezoelectric element. For example, at the initial stage after the manufacturing of the liquid ejecting apparatus, the ratio of a variation in the amount of deformation of the piezoelectric element relative to a cumulative number of drive pulses applied is high. When the cumulative number of drive pulses applied increases, the ratio of the variation in the amount of deformation of the piezoelectric element relative to the cumulative number of drive pulses applied decreases and becomes stable. It is known that, in order to suppress a variation in ejection characteristics such as the amount and flying speed of liquid ejected by the liquid ejecting apparatus, an aging process is performed to stabilize a variation in the amount of deformation of the piezoelectric element by applying a predetermined number of drive pulses to the piezoelectric element after the manufacturing (for example, JP-A-2009-26787).

However, the lifetime of the piezoelectric element may be reduced by the aging process. Therefore, there is a demand for increasing the lifetime of the piezoelectric element while suppressing a reduction in the ejection performance based on a variation in the amount of deformation of the piezoelectric element.

SUMMARY

According to an aspect of the present disclosure, a liquid ejecting apparatus is provided. The liquid ejecting apparatus includes a liquid ejecting head, a controller, and an acquirer. The liquid ejecting head includes a pressure chamber substrate having a plurality of pressure chambers, individual electrodes provided for the plurality of pressure chambers, a common electrode provided in common for the plurality of pressure chambers, a piezoelectric body disposed between the individual electrodes and the common electrode and configured to apply pressure to liquid within the pressure chambers, and a drive wiring electrically coupled to the individual electrodes and the common electrode. The controller controls an ejection operation of the liquid ejecting head by applying a drive voltage to the individual electrodes and applying a reference voltage to the common electrode to drive the piezoelectric body. The acquirer acquires information related to a cumulative number of times of the driving of the piezoelectric body. The controller drives the piezoelectric body such that, when the cumulative number of times of the driving is a first number of times, a voltage difference between the drive voltage and the reference voltage is a first value. The controller drives the piezoelectric body such that, when the cumulative number of times of the driving is a second number of times greater than the first number of times, the voltage difference is a second value smaller than the first value.

BRIEF DESCRIPTION OF THE DRAWINGS

FIG. 13 is an explanatory diagram illustrating an example of a correction table for the drive waveform.

FIG. 15 is an explanatory diagram illustrating a second example of a correction table for the drive waveform.

DESCRIPTION OF EXEMPLARY EMBODIMENTS

A. First Embodiment

Figure 1:
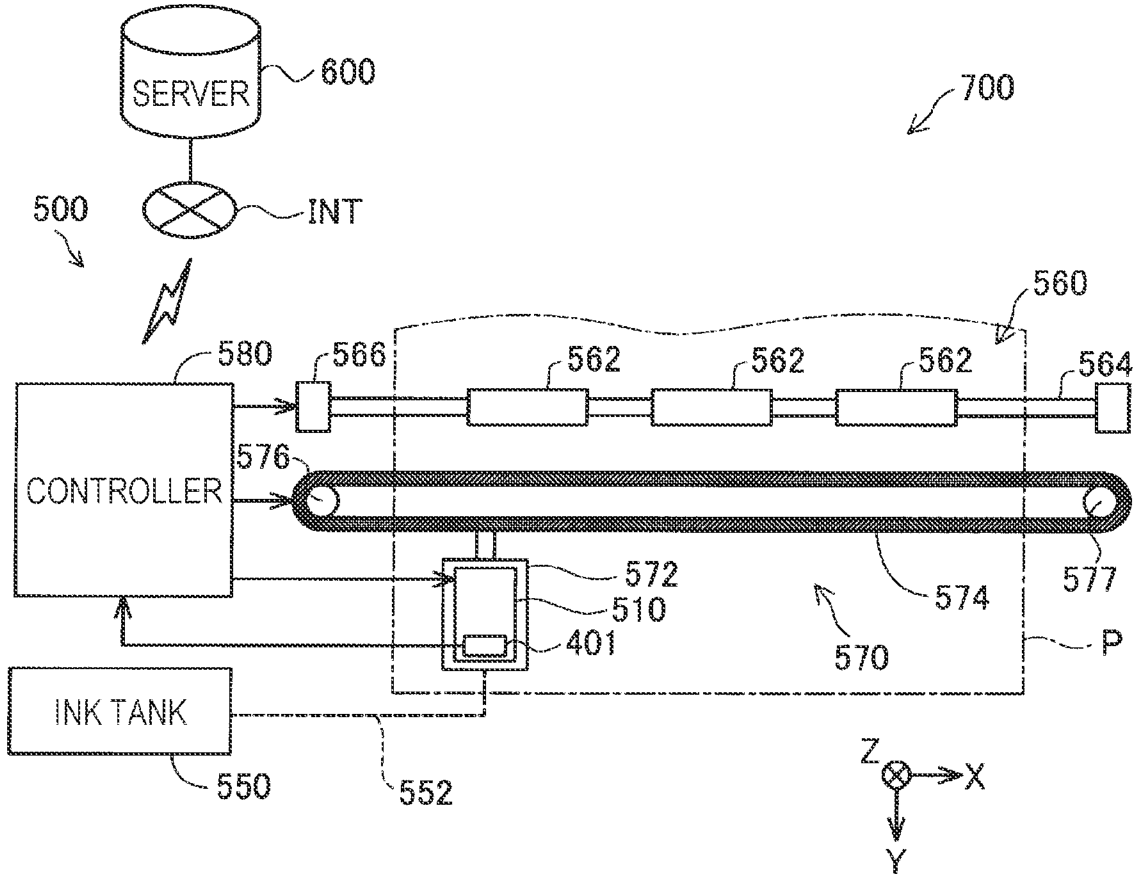
FIG. 1 is an explanatory diagram illustrating a schematic configuration of a liquid ejection system including a liquid ejecting apparatus according to a first embodiment of the present disclosure.

FIG. 1 is an explanatory diagram illustrating a schematic configuration of a liquid ejection system 700 including a liquid ejecting apparatus 500 according to a first embodiment of the present disclosure. The liquid ejection system 700 includes the liquid ejecting apparatus 500 according to the present embodiment and a server 600. X, Y, and Z illustrated in FIG. 1 and FIGS. 3 to 8 represent three spatial axes perpendicular to each other. In the present specification, directions along these axes are also referred to as an X axis direction, a Y axis direction, and a Z axis direction. In the following description, when orientation is specified, a positive direction is indicated with "+" and a negative direction is indicated with "−". In the following description, the positive and negative signs are used for notation of the directions, a direction to which an arrow points in each drawing is referred to as a + direction, and a direction opposite to the + direction is referred to as a − direction. In the present embodiment, the Z direction matches a vertical direction, the +Z direction indicates a vertical downward direction, and the −Z direction indicates a vertical upward direction. In addition, in the following description, when the positive direction and the negative direction are not specified, the three X, Y, and Z indicate the X axis, the Y axis, and the Z axis, respectively.

In the present embodiment, the liquid ejecting apparatus 500 is an ink jet printer that ejects ink as an example of liquid onto printing paper P to form an image on the printing paper P. The liquid ejecting apparatus 500 may eject the ink onto any type of medium such as a resin film, fabric, or cloth, instead of the printing paper P. As illustrated in FIG. 1, in the present embodiment, the liquid ejecting apparatus 500 can be connected to the server 600 via a wide area network (WAN) such as the Internet INT.

The liquid ejecting apparatus 500 includes a liquid ejecting head 510, an ink tank 550, a transport mechanism 560, a moving mechanism 570, and a controller 580. The liquid ejecting head 510 has a plurality of nozzles formed therein. For example, the liquid ejecting head 510 ejects ink of, for example, four colors, black, cyan, magenta, and yellow in the +Z direction to form an image on the printing paper P. The liquid ejecting head 510 is mounted on a carriage 572. As the carriage 572 moves forward and backward in a main scanning direction, the liquid ejecting head 510 moves forward and backward in the main scanning direction. In the present embodiment, the main scanning direction is the +X direction and the −X direction. The colors of the ink to be ejected by the liquid ejecting head 510 may not be limited to the four colors. The liquid ejecting head 510 may eject ink of any colors such as light cyan, light magenta, and white in addition to the above-described four colors.

The ink tank 550 stores the ink to be ejected by the liquid ejecting head 510. The ink tank 550 is coupled to the liquid ejecting head 510 via a tube 552 made of resin. The ink stored in the ink tank 550 is supplied to the liquid ejecting head 510 through the tube 552. The liquid ejecting apparatus 500 may include a bag-shaped liquid pack formed of a flexible film, instead of the ink tank 550.

The transport mechanism 560 transports the printing paper P in an auxiliary scanning direction. The auxiliary scanning direction is a direction intersecting the X axis direction, which is the main scanning direction. In the present embodiment, the auxiliary scanning direction is the +Y direction and the −Y direction. The transport mechanism 560 includes a transport rod 564 and a transport motor 566. Three transport rollers 562 are attached to the transport rod 564. The transport motor 566 drives and rotates the transport rod 564. When the transport motor 566 drives and rotates the transport rod 564, the printing paper P is transported in the +Y direction, which is the auxiliary scanning direction. The number of transport rollers 562 is not limited to three and may be any number. In addition, the liquid ejecting apparatus 500 may include a plurality of transport mechanisms 560.

The moving mechanism 570 includes a transport belt 574, a moving motor 576, and a pulley 577, in addition to the carriage 572. The liquid ejecting head 510 that can eject the ink is mounted on the carriage 572. The carriage 572 is fixed to the transport belt 574. The transport belt 574 is wrapped around the moving motor 576 and the pulley 577. When the moving motor 576 is driven to rotate, the transport belt 574 moves forward and backward in the main scanning direction. As a result, the carriage 572 fixed to the transport belt 574 moves forward and backward in the main scanning direction.

Figure 2:
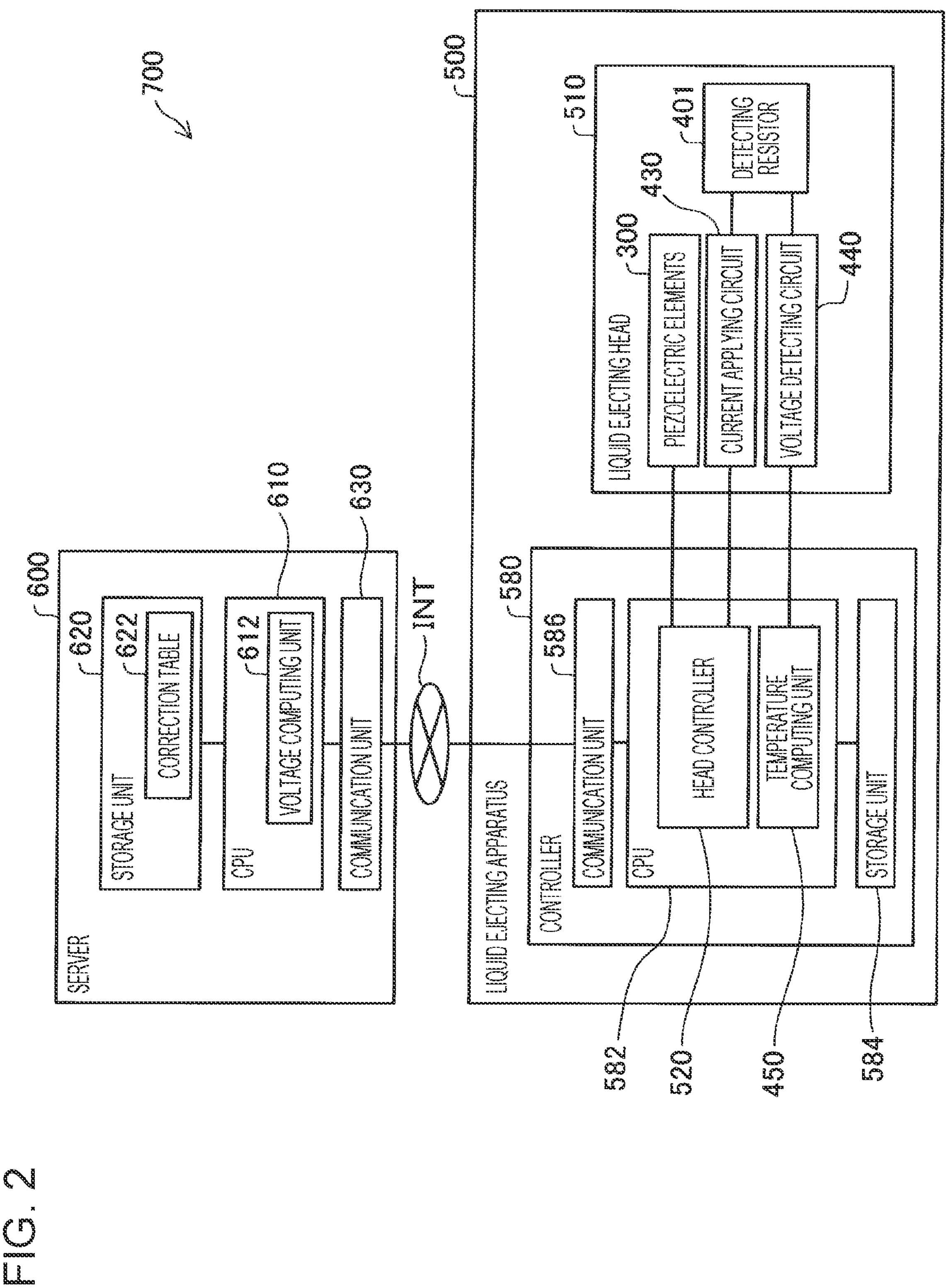
FIG. 2 is a block diagram illustrating a functional configuration of the liquid ejection system.

FIG. 2 is a block diagram illustrating a functional configuration of the liquid ejection system 700. In FIG. 2, some configurations of the liquid ejecting apparatus 500, such as the ink tank 550, the transport mechanism 560, and the moving mechanism 570, are omitted.

The liquid ejecting head 510 includes piezoelectric elements 300, a detecting resistor 401, a current applying circuit 430, and a voltage detecting circuit 440. The piezoelectric elements 300 change pressure applied to the ink within pressure chambers of the liquid ejecting head 510 as described later. The detecting resistor 401 is a resistance wiring to be used to detect a temperature of the ink within the pressure chambers. The current applying circuit 430 applies a current to the detecting resistor 401 under control by a head controller 520. In the present embodiment, the current applying circuit 430 is a constant current circuit that causes a predetermined constant current to flow through the detecting resistor 401. The voltage detecting circuit 440 detects the value of a voltage generated in the detecting resistor 401 by the application of the current.

The controller 580 is configured as a microcomputer and includes a CPU 582 and a storage unit 584. As the storage unit 584, for example, a nonvolatile memory that is an EEPROM or the like and in which data can be deleted by an electric signal, a nonvolatile memory that is a one-time PROM, an EPROM, or the like and in which data can be deleted by an ultraviolet ray, a nonvolatile memory that is a PROM or the like and in which data cannot be deleted, and the like can be used. In the storage unit 584, various programs that enable functions provided in the present embodiment are stored. The CPU 582 loads and executes a program stored in the storage unit 584 to function as the head controller 520 and a temperature computing unit 450.

The temperature computing unit 450 detects the temperature of the detecting resistor 401 using the characteristic that the electric resistance value of the resistance wiring made of metal, a semiconductor, or the like changes based on the temperature. The temperature computing unit 450 estimates the detected temperature of the detecting resistor 401 as a temperature of the ink within the pressure chambers. The temperature computing unit 450 acquires the resistance value of the detecting resistor 401 based on the value of the current applied to the detecting resistor 401 from the current applying circuit 430 and the value of the voltage generated in the detecting resistor 401 and detected by the voltage detecting circuit 440. The temperature computing unit 450 uses the acquired resistance value of the detecting resistor 401 and a temperature arithmetic equation stored in the storage unit 584 to calculate the temperature of the ink within the pressure chambers. The temperature arithmetic equation indicates a correspondence relationship between the electric resistance value of the detecting resistor 401 and the temperature of the detecting resistor 401. The temperature computing unit 450 outputs the calculated temperature of the ink within the pressure chambers to the head controller 520.

The head controller 520 comprehensively controls each of the units of the liquid ejecting head 510. The head controller 520 controls, for example, an operation of moving the carriage 572 forward and backward in the main scanning direction, an operation of transporting the printing paper P in the auxiliary scanning direction, and an ejection operation of the liquid ejecting head 510. As the ejection operation of the liquid ejecting head 510, for example, the head controller 520 can output, to the liquid ejecting head 510, a drive signal based on the temperature of the ink within the pressure chambers acquired from the temperature computing unit 450 and drive the piezoelectric elements 300 to control the ejection of the ink to the printing paper P. In the present embodiment, the head controller 520 functions as an acquirer that controls the supply of the current to the detecting resistor 401 from the current applying circuit 430 and counts and acquires a cumulative number of times of driving that is a cumulative number of times that a drive voltage is applied to the piezoelectric elements.

The controller 580 further includes a communication unit 586. The communication unit 586 includes a wide area network (WAN) interface and communicates with an external network such as the Internet INT. The communication unit 586 functions as a transmitter that transmits, to the server 600, the temperature detected by the detecting resistor 401 and the cumulative number of times of the driving acquired by the head controller 520 serving as the acquirer. The communication unit 586 also functions as a receiver that receives, from the server 600, the drive voltage and a reference voltage that correspond to the transmitted temperature detected by the detecting resistor 401 and the transmitted cumulative number of times of the driving.

The server 600 includes a CPU 610, a storage unit 620, and a communication unit 630. The communication unit 630 communicates with the communication unit 586 of the liquid ejecting apparatus 500 via the wide area network such as the Internet INT. The storage unit 620 is, for example, a RAM, a ROM, a hard disk drive (HDD), or the like. In the storage unit 620, various programs for enabling functions provided in the present embodiment are stored. The CPU 610 executes a program stored in the storage unit 620 to function as a voltage computing unit 612. In the storage unit 620, the cumulative number of times of the driving received from the liquid ejecting apparatus 500 and the temperature detected by the detecting resistor 401 are temporarily stored.

The voltage computing unit 612 determines the drive voltage to be applied to the piezoelectric elements 300 and the reference voltage to be applied to the piezoelectric elements 300 as a condition for driving the piezoelectric elements 300 that corresponds to the cumulative number of times of the driving received from the liquid ejecting apparatus 500 and the temperature detected by the detecting resistor 401. In the present embodiment, the voltage computing unit 612 uses a correction table 622 stored in the storage unit 620 to determine the drive voltage and the reference voltage. The voltage computing unit 612 may determine the drive voltage and the reference voltage by performing calculation using a predetermined equation, instead of the correction table 622. As described later, the correction table 622 indicates correspondence relationships between the cumulative number of times of the driving and the result of detecting the temperature by the detecting resistor 401, and correction values for the drive voltage and the reference voltage.

Figure 3:
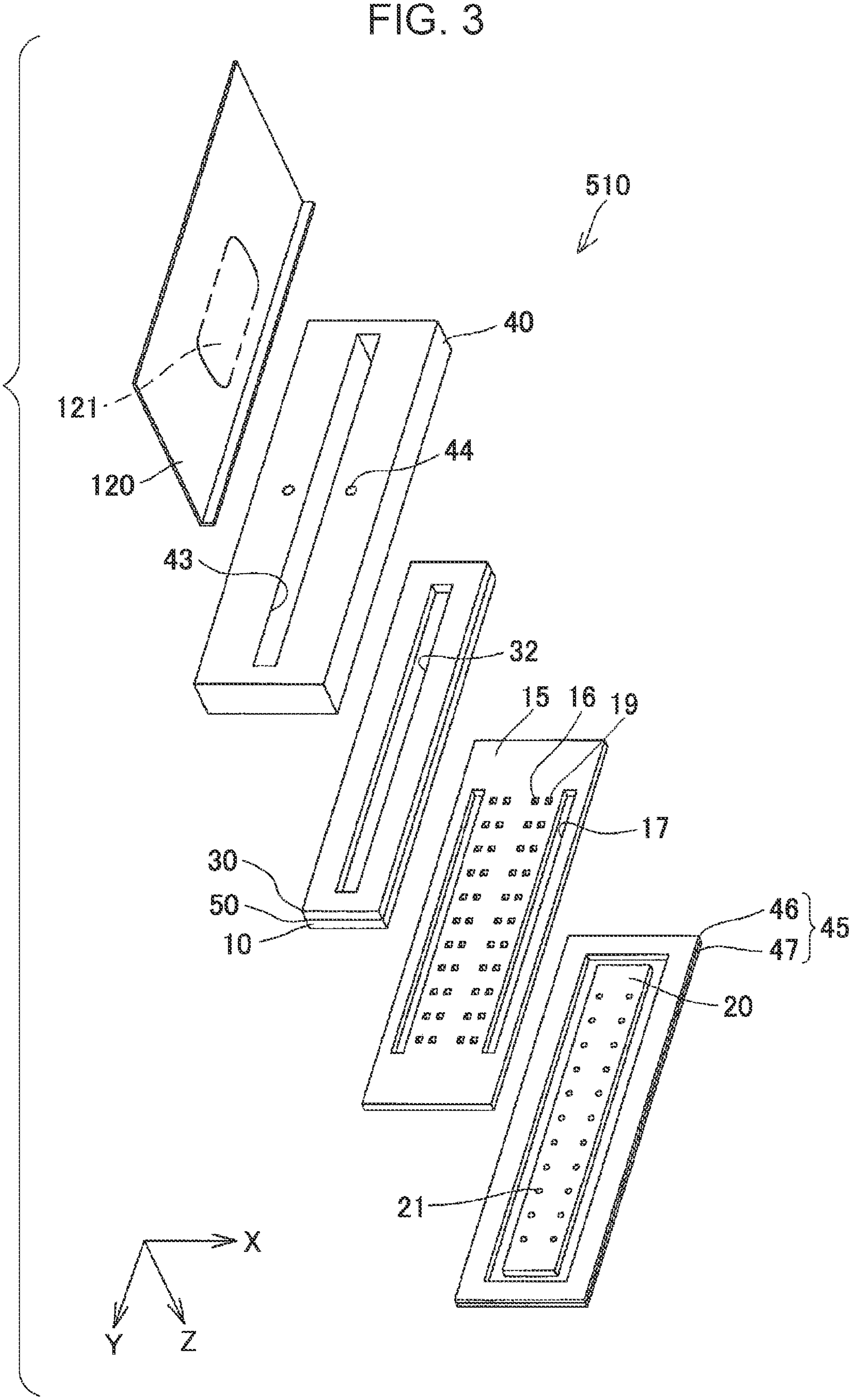
FIG. 3 is a disassembled perspective view illustrating a configuration of a liquid ejecting head.
Figure 4:
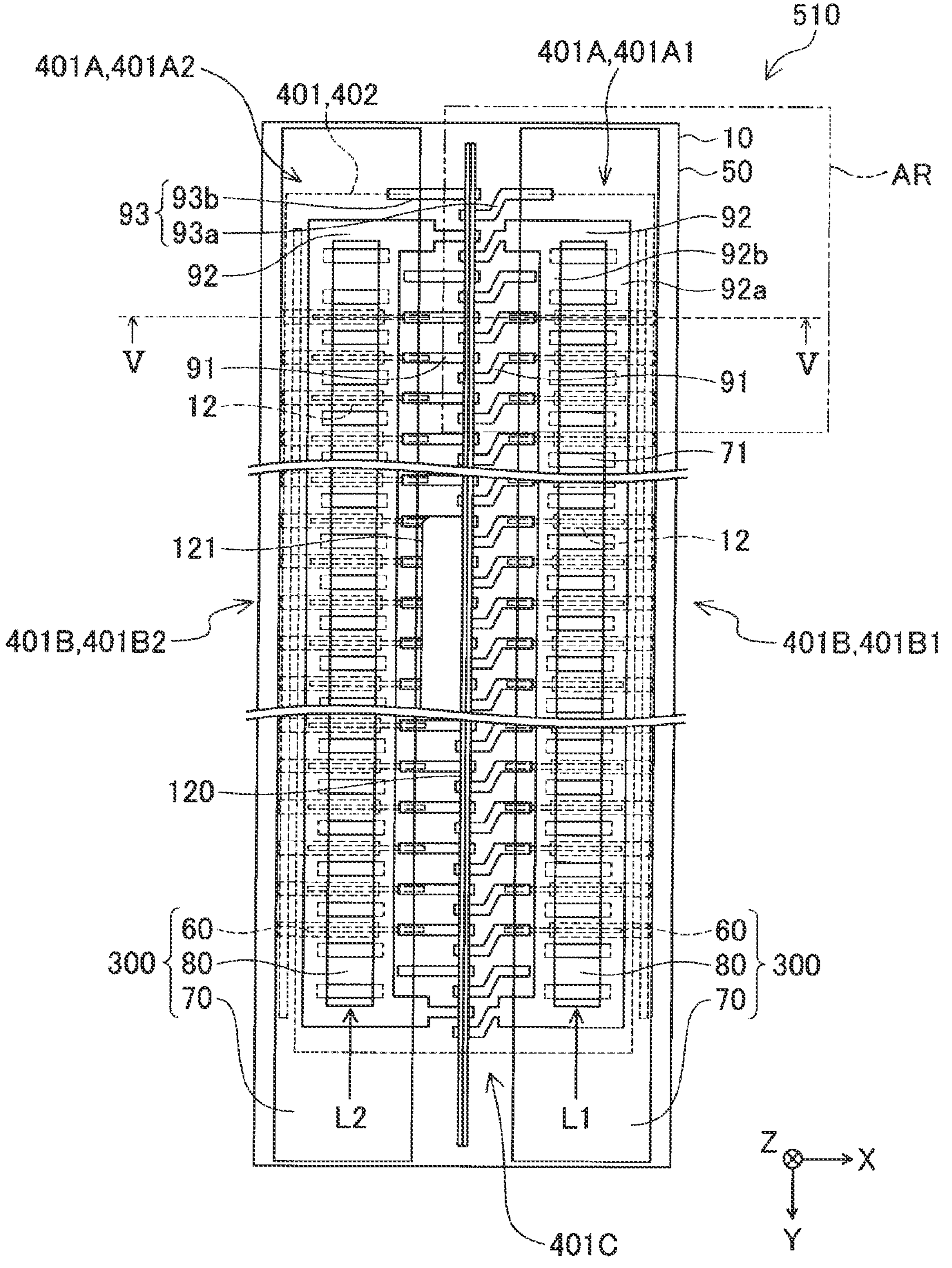
FIG. 4 is an explanatory diagram illustrating a configuration of the liquid ejecting head as viewed in plan view.
Figure 5:
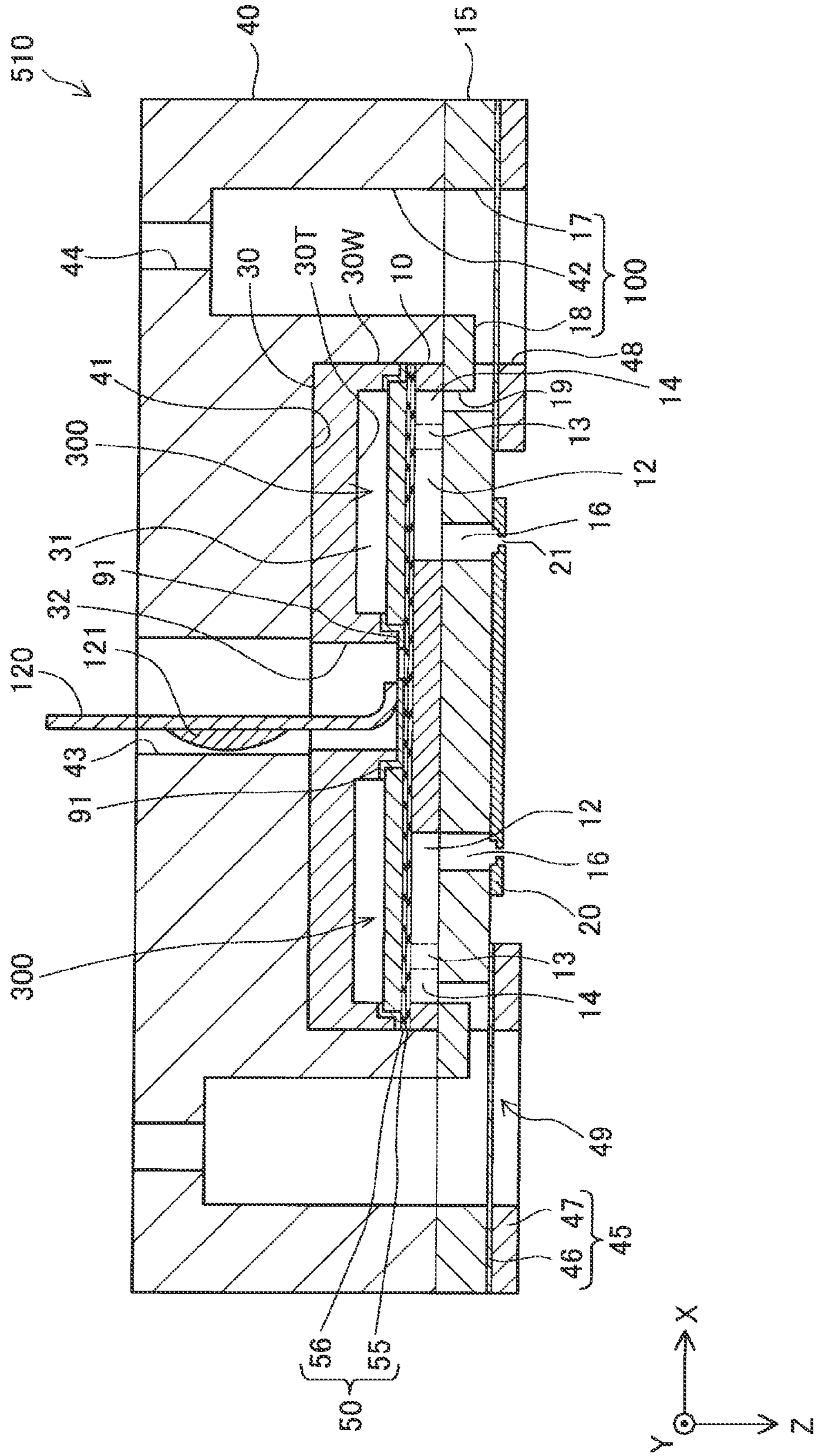
FIG. 5 is a cross-sectional view taken along line V-V illustrated in FIG. 4.

A detailed configuration of the liquid ejecting head 510 is described with reference to FIGS. 3 to 5. FIG. 3 is a disassembled perspective view illustrating a configuration of the liquid ejecting head 510. FIG. 4 is an explanatory diagram illustrating a configuration of the liquid ejecting head 510 as viewed in plan view. FIG. 4 illustrates the configuration located around a pressure chamber substrate 10 in the liquid ejecting head 510. In FIG. 4, illustrations of a sealing substrate 30 and a casing member 40 are omitted in order to facilitate understanding of the techniques. FIG. 5 is a cross-sectional view taken along line V-V illustrated in FIG. 4.

As illustrated in FIG. 3, the liquid ejecting head 510 includes the pressure chamber substrate 10, a communication plate 15, a nozzle plate 20, a compliant substrate 45, the sealing substrate 30, the casing member 40, a vibration plate 50, and a relay substrate 120 and also includes the piezoelectric elements 300 illustrated in FIG. 4. The pressure chamber substrate 10, the communication plate 15, the nozzle plate 20, the compliant substrate 45, the vibration plate 50, the piezoelectric elements 300, the sealing substrate 30, and the casing member 40 are stacked members and are stacked to form the liquid ejecting head 510. In the present disclosure, a direction in which the stacked members forming the liquid ejecting head 510 are stacked is also referred to as a "stacking direction". In the present embodiment, the stacking direction matches the Z axis direction.

The pressure chamber substrate 10 is formed of, for example, a silicon substrate, a glass substrate, an SOI substrate, any one or more of various ceramic substrates, or the like. As illustrated in FIG. 4, in the pressure chamber substrate 10, the plurality of pressure chambers 12 are arrayed in a direction defined in advance. The direction in which the plurality of pressure chambers 12 are arrayed is also referred to as an "array direction". Each of the pressure chambers 12 is formed in a substantially rectangular shape in which a length of the pressure chamber 12 in the X axis direction is longer than a length of the pressure chamber 12 in the Y axis direction as viewed in plan view. In the present disclosure, each "plan view" means a state in which an object is viewed in the stacking direction. The shape of each of the pressure chambers 12 is not limited to the rectangular shape and may be a parallelogram shape, a polygonal shape, a circular shape, an oval shape, or the like. The oval shape means a shape that is based on a rectangular shape and in which both ends of the shape are semicircular in the longitudinal direction of the shape. The oval shape may be a rounded rectangular shape, an elliptical shape, an egg shape, or the like.

In the present embodiment, the plurality of pressure chambers 12 are arrayed in two columns in the array direction, which is the Y axis direction. In the example illustrated in FIG. 4, in the pressure chamber substrate 10, two pressure chamber arrays, a first pressure chamber array L1 whose array direction is the Y axis direction and a second pressure chamber array L2 whose array direction is the Y axis direction, are formed. The first pressure chamber array L1 and the second pressure chamber array L2 are arranged on both sides of the relay substrate 120, while the relay substrate 120 is interposed between the first pressure chamber array L1 and the second pressure chamber array L2. Specifically, the second pressure chamber array L2 is arranged on the side opposite to the first pressure chamber array L1 with the relay substrate 120 interposed therebetween in a direction intersecting the array direction of the first pressure chamber array L1. A direction orthogonal to the array direction and the stacking direction is also referred to as an "intersecting direction". In the example illustrated in FIG. 4, the intersecting direction is the X axis direction, and the second pressure chamber array L2 is arranged in the −X direction with respect to the first pressure chamber array L1 with the relay substrate 120 interposed therebetween. The plurality of pressure chambers 12 may not be linearly arrayed. For example, the plurality of pressure chambers 12 may be arranged in a so-called staggered pattern in the Y axis direction such that the pressure chambers 12 are alternately arranged in the intersecting direction. The positions of the plurality of pressure chambers 12 belonging to the first pressure chamber array L1 match the positions of the plurality of pressure chambers 12 belonging to the second pressure chamber array L2 in the array direction, and the plurality of pressure chambers 12 belonging to the first pressure chamber array L1 are adjacent to the plurality of pressure chambers 12 belonging to the second pressure chamber array L2 in the intersecting direction.

As illustrated in FIG. 3, the communication plate 15, the nozzle plate 20, and the compliant substrate 45 are stacked on the +Z direction side of the pressure chamber substrate 10. The communication plate 15 is a flat member formed of, for example, a silicon substrate, a glass substrate, an SOI substrate, any one or more of various ceramic substrates, a metal substrate, or the like. As the metal substrate, for example, a stainless substrate or the like may be used. As illustrated in FIG. 5, the communication plate 15 has a nozzle communication path 16, a first manifold 17, a second manifold 18, and supply communication paths 19. The communication plate 15 may be made of a material having substantially the same coefficient of thermal expansion as that of the pressure chamber substrate 10. Therefore, when the temperature of the pressure chamber substrate 10 and the temperature of the communication plate 15 change, it is possible to suppress warping of the pressure chamber substrate 10 and the communication plate 15 due to the difference between the coefficients of thermal expansion.

As illustrated in FIG. 5, the nozzle communication path 16 is a flow path that allows the pressure chambers 12 to communicate with the nozzles 21. The first manifold 17 and the second manifold 18 function as a part of a manifold 100 serving as a common liquid chamber communicating with the plurality of pressure chambers 12. The first manifold 17 is provided so as to penetrate the communication plate 15 in the Z axis direction. On the other hand, the second manifold 18 is disposed in a surface of the communication plate 15 on the +Z axis direction side without penetrating the communication plate 15 in the Z axis direction.

As illustrated in FIG. 5, the supply communication paths 19 are flow paths coupled to a pressure chamber supply path 14 disposed in the pressure chamber substrate 10. The pressure chamber supply path 14 is a flow path coupled to one ends of the pressure chambers 12 in the +X axis direction via a throttling portion 13. The throttling portion 13 is a flow path disposed between the pressure chambers 12 and the pressure chamber supply path 14. The inner wall of the throttling portion 13 protrudes more than the pressure chambers 12 and the pressure chamber supply path 14. The throttling portion 13 is formed narrower than the pressure chambers 12 and the pressure chamber supply path 14. Therefore, the throttling portion 13 is set to have a higher flow resistance than those of the pressure chambers 12 and the pressure chamber supply path 14. According to the liquid ejecting head 510 configured in the above-described manner, even when pressure is applied to the pressure chambers 12 by the piezoelectric elements 300 in order to eject the ink, it is possible to suppress or prevent the ink within the pressure chambers 12 from flowing back to the pressure chamber supply path 14. The plurality of supply communication paths 19 are arrayed in the Y axis direction, that is, the array direction. Each of the supply communication paths 19 is individually provided for a respective one of the pressure chambers 12. The supply communication paths 19 and the pressure chamber supply path 14 allow the second manifold 18 to communicate with each of the pressure chambers 12 and supply the ink within the manifold 100 to each of the pressure chambers 12.

The nozzle plate 20 is disposed on the side opposite to the pressure chamber substrate 10 with the communication plate 15 interposed therebetween. That is, the nozzle plate 20 is disposed on the surface of the communication plate 15 on the +Z direction side. The material of the nozzle plate 20 is not limited. For example, as the material of the nozzle plate 20, a silicon substrate, a glass substrate, an SOI substrate, any one or more of various ceramic substrates, and a metal substrate can be used. For example, as the metal substrate, a stainless substrate or the like may be used. As the material of the nozzle plate 20, an organic material such as polyimide resin can also be used. However, as the material of the nozzle plate 20, a material having substantially the same coefficient of thermal expansion as that of the communication plate 15 may be used. Therefore, when the temperature of the nozzle plate 20 and the temperature of the communication plate 15 change, it is possible to suppress warping of the nozzle plate 20 and the communication plate 15 due to the difference between the coefficients of thermal expansion.

The plurality of nozzles 21 are formed in the nozzle plate 20. Each of the nozzles 21 communicates with each of the pressure chambers 12 via the nozzle communication path 16. As illustrated in FIG. 3, the plurality of nozzles 21 are arrayed in the array direction of the pressure chambers 12, that is, in the Y axis direction. Two nozzle arrays in which the plurality of nozzles 21 are arrayed are disposed in the nozzle plate 20. The two nozzle arrays are provided corresponding to the first pressure chamber array L1 and the second pressure chamber array L2.

As illustrated in FIG. 5, the compliant substrate 45 and the nozzle plate 20 are disposed on the side opposite to the pressure chamber substrate 10 with the communication plate 15 interposed therebetween. That is, the compliant substrate 45 is disposed on the surface of the communication plate 15 on the +Z direction side. The compliant substrate 45 is disposed around the nozzle plate 20 and covers openings of the first manifold 17 and the second manifold 18 disposed in the communication plate 15. In the present embodiment, the compliant substrate 45 includes a sealing membrane 46 and a fixed substrate 47 made of a rigid material such as metal. The sealing membrane 46 is flexible and thin. As illustrated in FIG. 5, a region of the fixed substrate 47 facing the manifold 100 is an opening 48 formed by completely removing a portion of the fixed substrate 47 in a thickness direction. Therefore, one surface of the manifold 100 forms a compliant portion 49 sealed by only the sealing membrane 46.

As illustrated in FIG. 5, the vibration plate 50 and the piezoelectric elements 300 are stacked on the side opposite to the nozzle plate 20 and the like with the pressure chamber substrate 10 interposed between therebetween. That is, the vibration plate 50 and the piezoelectric elements 300 are stacked on the surface of the pressure chamber substrate 10 on the −Z direction side. The piezoelectric elements 300 cause the vibration plate 50 to bend and deform so as to change pressure applied to the ink within the pressure chambers 12. In FIG. 5, the configuration of each of the piezoelectric elements 300 is illustrated in a simplified manner in order to facilitate understanding of the techniques. The vibration plate 50 is disposed on the +Z direction side of the piezoelectric elements 300, and the pressure chamber substrate 10 is disposed on the +Z direction side of the vibration substrate 50.

As illustrated in FIG. 5, the sealing substrate 30 that has substantially the same size as that of the pressure chamber substrate 10 as viewed in plan view is bonded to the surface of the pressure chamber substrate 10 on the −Z direction side via an adhesive 39 described later. The sealing substrate 30 has a top portion 30T, a wall portion 30W, holding spaces 31, and a through-hole 32. The holding spaces 31 are U-shaped spaces defined by the top portion 30T and the wall portion 30W and protect active portions of the piezoelectric elements 300. Each of the holding spaces 31 of the sealing substrate 30 is provided for a respective one of arrays of the piezoelectric elements 300 arrayed in the array direction. In the present embodiment, two holding spaces 31 arranged adjacent to each other in the X axis direction are formed. In addition, the through-hole 32 extends in the Y axis direction between the two holding spaces 31 and penetrates the sealing substrate 30 in the Z axis direction.

As illustrated in FIG. 5, the casing member 40 is fixed onto the sealing substrate 30. The casing member 40 forms the manifold 100 together with the communication plate 15. The manifold 100 communicates with the plurality of pressure chambers 12. The casing member 40 has substantially the same outer shape as that of the communication plate 15 as viewed in plan view and is bonded to the sealing substrate 30 and the communication plate 15 so as to cover the sealing substrate 30 and the communication plate 15.

The casing member 40 has a storage space 41, a supply port 44, a third manifold 42, and a coupling port 43. The storage space 41 is a space having a depth sufficient to store the pressure chamber substrate 10 and the sealing substrate 30. The third manifold 42 is spaces formed on both outer sides of the storage space 41 in the X axis direction in the casing member 40. The manifold 100 is formed by coupling the third manifold 42 to the first manifold 17 and the second manifold 18 disposed in the communication plate 15. The manifold 100 has an elongated shape that is continuous in the Y axis direction. The supply port 44 communicates with the manifold 100. The ink is supplied to each manifold 100 through the supply port 44. The coupling port 43 is a through-hole communicating with the through-hole 32 of the sealing substrate 30. The relay substrate 120 is inserted through the coupling port 43.

The liquid ejecting head 510 according to the present embodiment takes in the ink supplied from the ink tank 550 illustrated in FIG. 1 through the supply port 44 illustrated in FIG. 5 and fills an internal flow path extending from the manifold 100 to the nozzles 21 with the ink. Thereafter, the liquid ejecting head 510 applies a voltage based on the drive signal to each of the piezoelectric elements 300 corresponding to the plurality of pressure chambers 12. As a result, the vibration plate 50 warps and deforms together with the piezoelectric elements 300, the pressure within each of the pressure chambers 12 increases, and an ink droplet is ejected from each of the nozzles 21.

Figure 6:
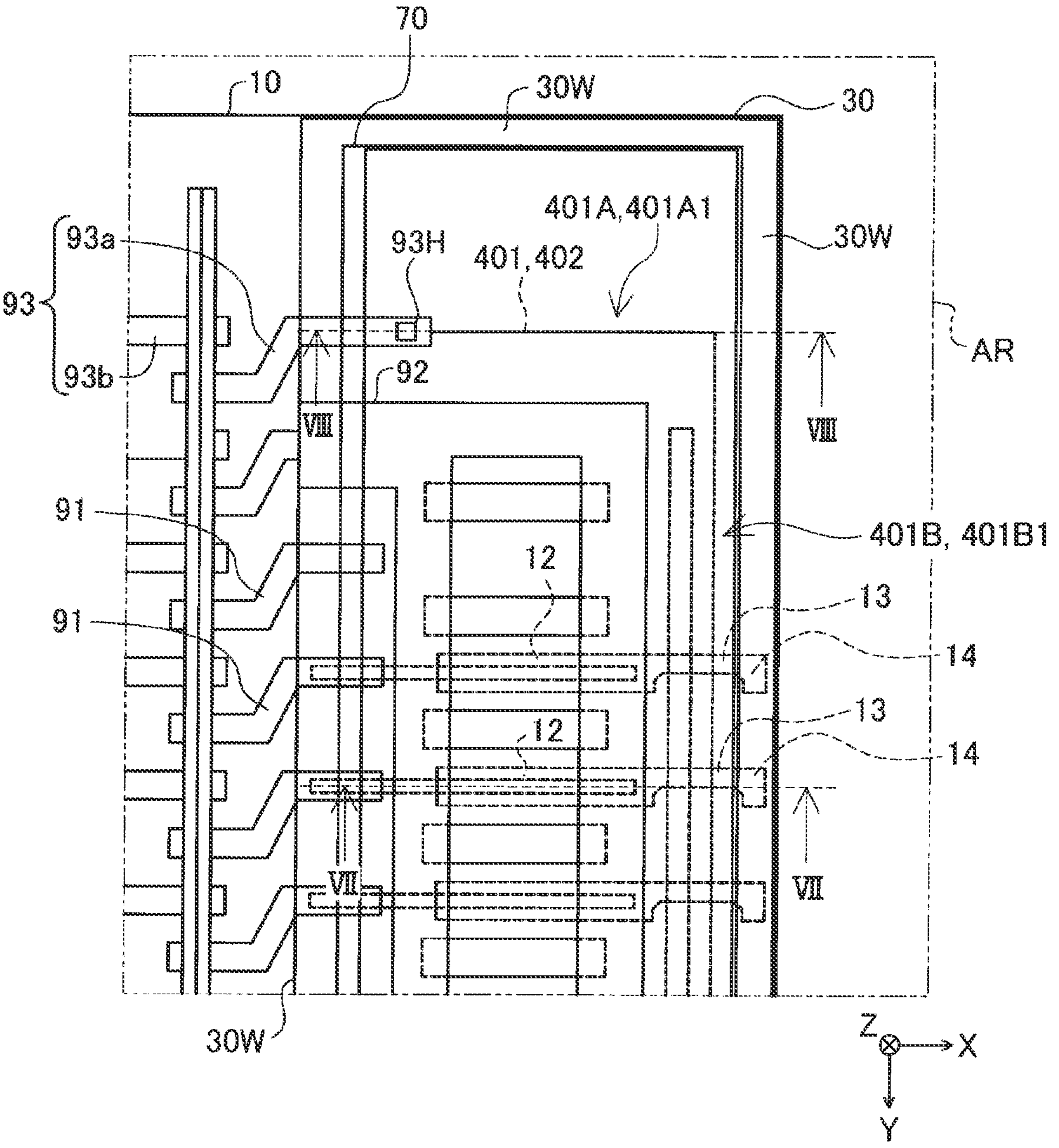
FIG. 6 is a cross-sectional enlarged view illustrating a partial range illustrated in FIG. 4.
Figure 7:
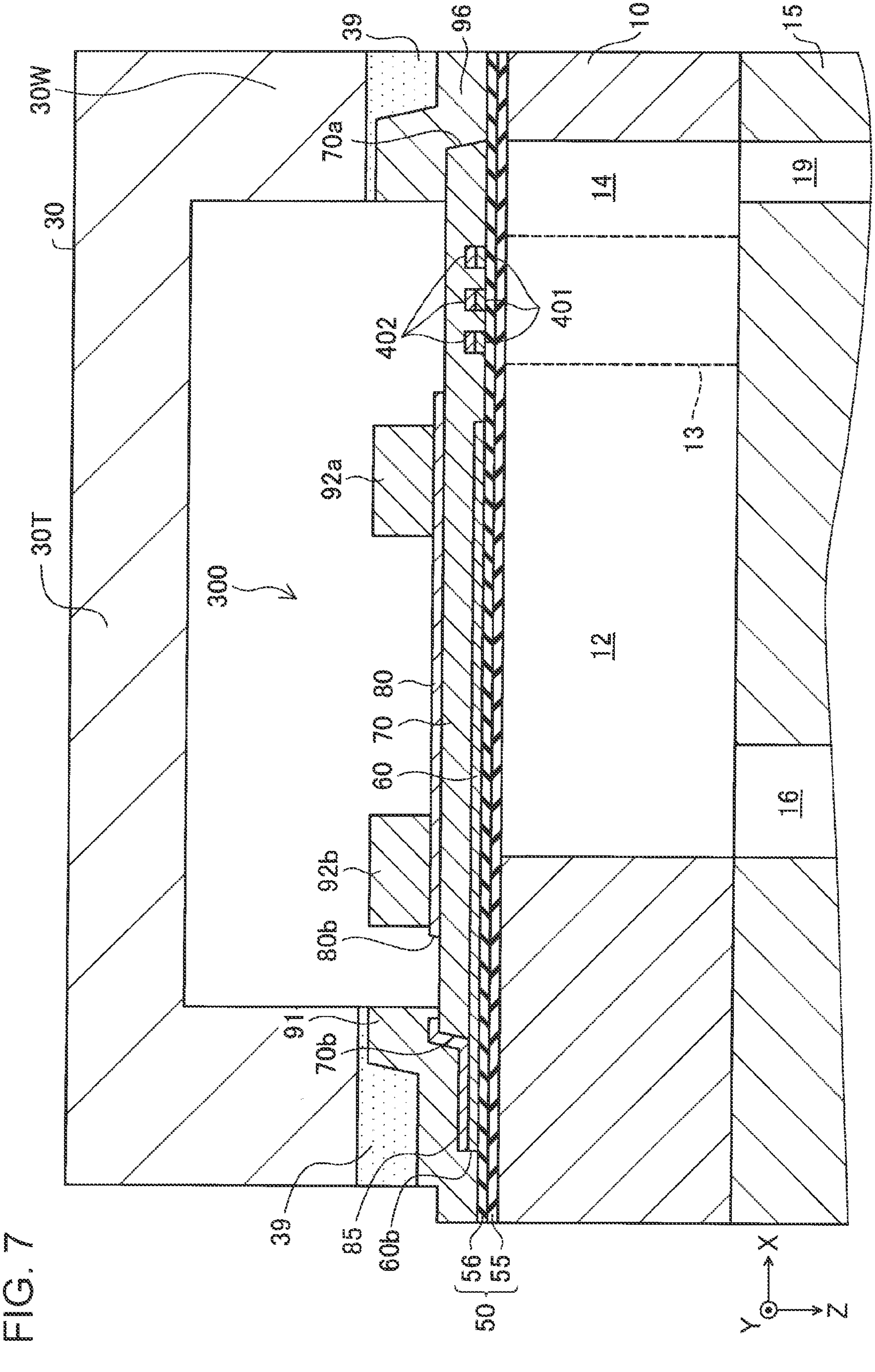
FIG. 7 is a cross-sectional view taken along line VII-VII illustrated in FIG. 6.
Figure 8:
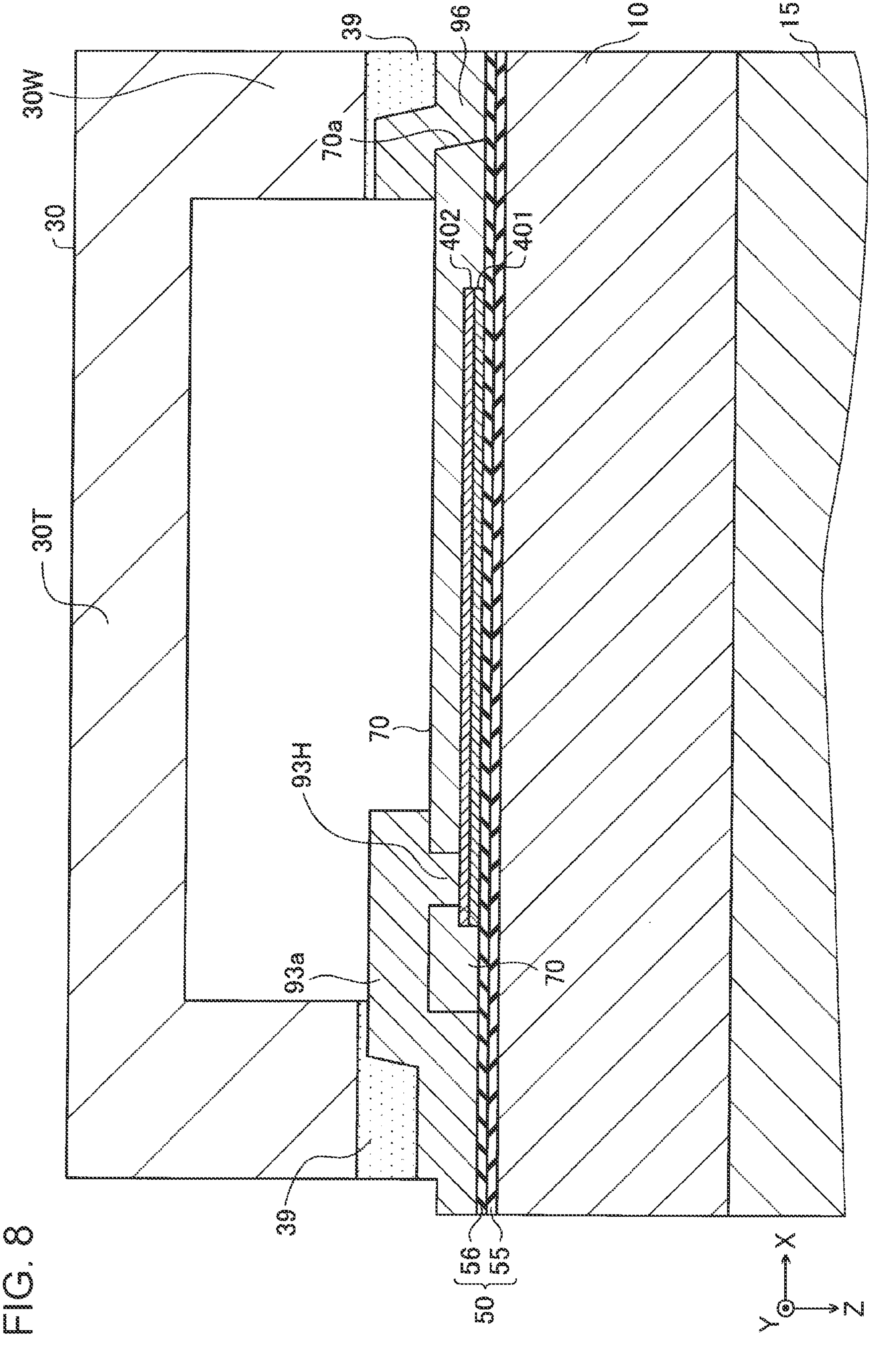
FIG. 8 is a cross-sectional view taken along line VIII-VIII illustrated in FIG. 6.

The configurations of the piezoelectric elements 300 and the detecting resistor 401 are described with reference to FIGS. 4, 5, and 6 to 8. FIG. 6 is a cross-sectional enlarged view illustrating a range AR illustrated in FIG. 4. FIG. 7 is a cross-sectional view taken along line VII-VII illustrated in FIG. 6. FIG. 8 is a cross-sectional view taken along line VIII-VIII illustrated in FIG. 6. As illustrated in FIG. 6, the liquid ejecting head 510 includes the vibration plate 50, the piezoelectric elements 300, individual lead electrodes 91, a common lead electrode 92, a measurement lead electrode 93, and the detecting resistor 401 on the −Z direction side of the pressure chamber substrate 10.

As illustrated in FIG. 7, the vibration plate 50 includes an elastic membrane 55 made of silicon oxide ($SiO_2$) and disposed on the pressure chamber substrate 10 side, and an insulating membrane 56 made of zirconium oxide ($ZrO_2$) and disposed on the elastic membrane 55. The flow paths such as the pressure chambers 12 are formed in the pressure chamber substrate 10 by performing anisotropic etching on the pressure chamber substrate 10 from the surface of the pressure chamber substrate 10 on the +Z direction side. The elastic membrane 55 constitutes surfaces of the flow paths such as the pressure chambers 12 on the −Z direction side. The vibration plate 50 may be constituted by either the elastic membrane 55 or the insulating membrane 56 and may include another membrane other than the elastic membrane 55 and the insulating membrane 56. Examples of materials of the other membranes are silicon and silicon nitride.

The piezoelectric elements 300 apply pressure to the pressure chambers 12. As illustrated in FIG. 7, the piezoelectric elements 300 include first electrodes 60, a piezoelectric body 70, and a second electrode 80. The first electrodes 60, the piezoelectric body 70, and the second electrode 80 are stacked in the stacking direction from the +Z direction side to the −Z direction side in this order. The piezoelectric body 70 is disposed between the first electrodes 60 and the second electrode 80 in the stacking direction in which the first electrodes 60, the piezoelectric body 70, and the second electrode 80 are stacked.

Each of the first electrodes 60 and the second electrode 80 is electrically coupled to the relay substrate 120 illustrated in FIG. 5. The first electrodes 60 and the second electrode 80 apply a voltage based on the drive signal to the piezoelectric body 70. A portion of the piezoelectric body 70 in which piezoelectric strain occurs when the voltage is applied between the first electrodes 60 and the second electrode 80 in the piezoelectric elements 300 is also referred to as an active portion. The active portion is a portion where the piezoelectric body 70 is interposed between the first electrodes 60 and the second electrode 80 in the piezoelectric elements 300.

A drive voltage that varies according to an amount of the ink to be ejected is applied to the first electrodes 60. The reference voltage determined in advance is applied to the second electrode 80, regardless of the amount of the ink to be ejected. When the drive voltage applied to the first electrodes 60 is different from the reference voltage applied to the second electrode 80, the piezoelectric body 70 of the piezoelectric elements 300 deforms. Portions that actually deform in the Z axis direction when the piezoelectric elements 300 are driven are also referred to as flexible portions. Portions that are included in the piezoelectric elements 300 and face the pressure chambers 12 in the Z axis direction are the flexible portions. Due to the deformation of the piezoelectric body 70, the vibration plate 50 deforms or vibrates to change the volumes of the pressure chambers 12. Due to the changes in the volumes of the pressure chambers 12, pressure is applied to the ink stored in the pressure chambers 12 and the ink is ejected from the nozzles 21 through the nozzle communication path 16.

The first electrodes 60 are individual electrodes individually provided for the plurality of pressure chambers 12. As illustrated in FIG. 7, the first electrodes 60 are lower electrodes disposed on the side opposite to the second electrode 80 with the piezoelectric body 70 interposed therebetween. That is, the first electrodes 60 are disposed on a lower portion of the piezoelectric body 70 on the +Z direction side of the piezoelectric body 70. The first electrodes 60 have a thickness of approximately 80 nanometers, for example. The first electrodes 60 are made of a conductive material such as metal such as platinum (Pt), iridium (Ir), gold (Au), or titanium (Ti) or conductive metal oxide such as indium tin oxide abbreviated as ITO. The first electrodes 60 may be formed by stacking a plurality of materials such as platinum (Pt), iridium (Ir), gold (Au), and a titanium (Ti). In the present embodiment, platinum (Pt) is used as the first electrodes 60.

As illustrated in FIG. 4, the piezoelectric body 70 has a predetermined width in the X axis direction and extends in the array direction of the pressure chambers 12, that is, in the Y axis direction. As illustrated in FIG. 7, an end portion 70*a* of the piezoelectric body 70 in the +X direction is covered with a wiring portion 96 formed simultaneously with the individual lead electrodes 91. The adhesive 39 for adhesion of the wall portion 30W of the sealing substrate 30 is disposed on an upper portion of the wiring portion 96. The wiring portion 96 can be omitted.

The piezoelectric body 70 may have a thickness in a range of approximately 1000 nanometers to 4000 nanometers, for example. An example of the piezoelectric body 70 is so-called perovskite crystal, which is a crystal membrane having a perovskite structure, made of a ferroelectric ceramic material, formed on the first electrodes 60, and exhibiting an electromechanical conversion action. As the material of the piezoelectric body 70, a ferroelectric piezoelectric material such as lead zirconate titanate (PZT), a material obtained by adding metal oxide such as niobium oxide, nickel oxide, or magnesium oxide to the ferroelectric piezoelectric material, and the like can be used. Specifically, as the material of the piezoelectric body 70, lead titanate ($PbTiO_3$), lead zirconate titanate ($Pb(Zr, Ti)O_3$), lead zirconate ($PbZrO_3$), lead lanthanum titanate ((Pb, La), $TiO_3$), lead lanthanum zirconate titanate ((Pb, La) (Zr, $Ti)O_3$), lead zirconium titanate magnesium niobate (Pb(Zr, Ti) (Mg, $Nb)O_3$), and the like can be used. In the present embodiment, lead zirconate titanate (PZT) is used as the piezoelectric body 70.

The material of the piezoelectric body 70 is not limited to a lead-based piezoelectric material containing lead. As the material of the piezoelectric body 70, a lead-free piezoelectric material not containing lead can be used. Examples of the lead-free piezoelectric material are bismuth ferrate (($BiFeO_3$), abbreviated as "BFO"), barium titanate (($BaTiO_3$), abbreviated as "BT"), potassium sodium niobate ((K, Na) ($NbO_3$), abbreviated as "KNN"), potassium sodium lithium niobate ((K, Na, Li) ($NbO_3$)), potassium sodium lithium niobate tantalate ((K, Na, Li) (Nb, $Ta)O_3$), bismuth potassium titanate (($Bi_{1/2}K_{1/2}$) $TiO_3$, abbreviated as "BKT"), bismuth sodium titanate (($Bi_{1/2}Na_{1/2})TiO_3$, abbreviated as "BNT"), bismuth manganate ($BiMnO_3$, abbreviated as "BM"), composite oxide ($x[(Bi_xK_{1-x})TiO_3]-(1-x)[BiFeO_3]$, abbreviated as "BKT-BF") containing bismuth, potassium, titanium, and iron and having a perovskite structure, composite oxide ($(1-x) [BiFeO_3]-x[BaTiO_3]$, abbreviated as "BFO-BT") containing bismuth, iron, barium, and titanium and having a perovskite structure, and a material ($(1-x) [Bi(Fe_{1-y}M_y)O_3]-x[BaTiO_3]$ (M is Mn, Co, or Cr)) obtained by adding metal such as manganese, cobalt, or chromium to the composite oxide ($(1-x) [BiFeO_3]-x[BaTiO_3]$, abbreviated as "BFO-BT").

As illustrated in FIG. 4, the second electrode 80 is a common electrode provided in common for the plurality of pressure chambers 12. The second electrode 80 has a predetermined width in the X axis direction and extends in the array direction of the pressure chambers 12, that is, in the Y axis direction. As illustrated in FIG. 7, the second electrode 80 is an upper electrode disposed on the side opposite to the first electrodes 60 with the piezoelectric body 70 interposed therebetween. That is, the second electrode 80 is disposed on an upper portion of the piezoelectric body 70 on the −Z direction side of the piezoelectric body 70. The material of the second electrode 80 is not limited. However, similarly to the first electrodes 60, as the material of the second electrode 80, a conductive material such as metal such as platinum (Pt), iridium (Ir), gold (Au), or titanium (Ti), or conductive metal oxide such as indium tin oxide abbreviated as ITO is used. Alternatively, the second electrode 80 may be formed by stacking a plurality of materials such as platinum (Pt), iridium (Ir), gold (Au), and titanium (Ti). In the present embodiment, iridium (Ir) is used as the second electrode 80.

As illustrated in FIG. 7, wiring portions 85 are disposed on the −X direction side with respect to an end portion 80*b* of the second electrode 80 in the −X direction. The wiring portions 85 are formed in a layer in which the second electrode 80 is formed. However, the wiring portions 85 are not electrically continuous with the second electrode 80. In a state in which the wiring portions 85 are spaced apart from the end portion 80*b* of the second electrode 80, the wiring portions 85 are formed so as to extend over an end portion 70*b* of the piezoelectric body 70 in the −X direction and end portions 60*b* of the first electrodes 60 in the −X direction. The end portions 60*b* of the first electrodes 60 in the −X direction extend more outwardly than the end portion 70*b* of the piezoelectric body 70. Each of the wiring portions 85 is provided for a respective one of the piezoelectric elements 300. The wiring portions 85 are arranged at intervals of a predetermined distance in the Y axis direction. The wiring portions 85 may be formed in the layer in which the second electrode 80 is formed.

Therefore, it is possible to simplify a process of forming the wiring portions 85 and reduce the cost of the wiring portions 85. However, the wiring portions 85 may be formed in a layer different from the layer in which the second electrode 80 is formed.

As illustrated in FIGS. 6 and 7, the individual lead electrodes 91 are electrically coupled to the first electrodes 60, which are individual electrodes, and extension portions 92*a* and 92*b* of the common lead electrode 92 are electrically coupled to the second electrode 80, which is a common electrode. The individual lead electrodes 91 and the common lead electrode 92 function as a drive wiring for applying, to the piezoelectric body 70, a voltage to drive the piezoelectric body 70. In the present embodiment, a power supply circuit that supplies power to the piezoelectric body 70 through the drive wiring is different from a current applying circuit 430 that supplies power to the detecting resistor 401.

As the material of the individual lead electrodes 91 and the material of the common lead electrode 92, conductive materials such as gold (Au), copper (Cu), titanium (Ti), tungsten (W), nickel (Ni), chromium (Cr), platinum (Pt), aluminum (Al), and the like can be used. In the present embodiment, gold (Au) is used as the individual lead electrodes 91 and the common lead electrode 92. In addition, the individual lead electrodes 91 and the common lead electrode 92 may have an adhesion layer for improving adhesion to the first electrodes 60, the second electrode 80, and the vibration plate 50.

The individual lead electrodes 91 and the common lead electrode 92 are formed in the same layer so as not to be electrically continuous with each other. As a result, it is possible to simplify a process of forming the individual lead electrodes 91 and the common lead electrode 92 and reduce the cost of the individual lead electrodes 91 and the common lead electrode 92, as compared with a case where the individual lead electrodes 91 and the common lead electrode 92 are separately formed. The individual lead electrodes 91 may be formed in a layer different from a layer in which the common lead electrode 92 is formed.

As illustrated in FIG. 6, each of the individual lead electrodes 91 is provided for a respective one of the first electrodes 60. As illustrated in FIG. 7, the individual lead electrodes 91 are coupled to the end portions 60*b* of the first electrodes 60 via the wiring portions 85 and extend to positions on the vibration plate 50 in the −X direction. The individual lead electrodes 91 are electrically coupled to the end portions 60*b* of the first electrodes 60 in the −X direction. The end portions 60*b* of the first electrodes 60 in the −X direction extend more outwardly than the end portion 70*b* of the piezoelectric body 70. The wiring portions 85 may be omitted and the individual lead electrodes 91 may be directly coupled to the end portions 60*b* of the first electrodes 60.

As illustrated in FIG. 4, the common lead electrode 92 extends in the Y axis direction and both ends of the common lead electrode 92 in the Y axis direction are bent and extend toward the −X direction. The common lead electrode 92 includes an extension portion 92*a* and an extension portion 92*b* that extend in the Y axis direction. As illustrated in FIGS. 4 and 5, one end portions of the individual lead electrodes 91 and one end portion of the common lead electrode 92 extend so as to be exposed in the through-hole 32 formed in the sealing substrate 30 and are electrically coupled to the relay substrate 120 in the through-hole 32.

The relay substrate 120 is, for example, a flexible substrate (flexible printed circuit (FPC)). A plurality of wirings for coupling the relay substrate 120 to the controller 580 and a power supply circuit not illustrated are formed on the relay substrate 120. The relay substrate 120 may be any flexible substrate such as a flexible flat cable (FFC), instead of the FPC. An integrated circuit 121 having a switching element is mounted on the relay substrate 120. A signal to drive the piezoelectric elements 300 is input to the integrated circuit 121. The integrated circuit 121 controls, based on the input signal, the timing of supplying, to the first electrodes 60, the signal to drive the piezoelectric elements 300. As a result, the timing of driving the piezoelectric elements 300 and an amount of the driving of the piezoelectric elements 300 are controlled.

FIGS. 4 and 6 illustrate the measurement lead electrode 93. The measurement lead electrode 93 is electrically coupled to the detecting resistor 401. In the present embodiment, the measurement lead electrode 93 is formed in the layer in which the individual lead electrodes 91 and the common lead electrode 92 are formed such that the measurement lead electrode 93, the individual lead electrodes 91, and the common lead electrode 92 are not electrically continuous with each other. The detecting resistor 401 is electrically coupled to the relay substrate 120 by the measurement lead electrode 93. As a result, the temperature computing unit 450 can detect the electric resistance value of the detecting resistor 401.

The measurement lead electrode 93 is made of a conductive material such as gold (Au), copper (Cu), titanium (Ti), tungsten (W), nickel (Ni), chromium (Cr), platinum (Pt), aluminum (Al), or the like. The material of the measurement lead electrode 93 is the same as the material of the individual lead electrodes 91 and the common lead electrode 92. Any material other than gold (Au) may be used as the material of the measurement lead electrode 93. The material of the measurement lead electrode 93 may be different from the material of the individual lead electrodes 91 and the common lead electrode 92.

As illustrated in FIG. 8, the measurement lead electrode 93 includes a wiring portion 93*a*, a wiring portion 93*b*, and a contact hole 93H. The wiring portion 93*a* and the wiring portion 93*b* extend to and are present on the upper portion of the piezoelectric body 70. The contact hole 93H is present in a through-hole 70H penetrating the piezoelectric body 70. The through-hole 70H can be formed at the time of the formation of the piezoelectric body 70 by performing ion milling or the like at the time of the formation of the piezoelectric body 70. The wiring portion 93*a* is electrically coupled to the detecting resistor 401 through the contact hole 93H. Although not illustrated, the wiring portion 93*b* is electrically coupled to the detecting resistor 401 through the contact hole 93H in a similar manner to the wiring portion 93*a*. The contact hole 93H may be disposed in only either the wiring portion 93*a* or the wiring portion 93*b*. The contact hole 93H may be omitted.

As illustrated in FIG. 4, the detecting resistor 401 is disposed on the surface of the vibration plate 50 on the −Z direction side. As illustrated in FIG. 4, in the present embodiment, the detecting resistor 401 is formed continuously extending so as to surround the first pressure chamber array L1 and the second pressure chamber array L2 as viewed in plan view. Specifically, the detecting resistor 401 includes a first extension portion 401A electrically coupled to the measurement lead electrode 93 as a first wiring portion, a second extension portion 401B continuous with the first extension portion 401A, and a third extension portion 401C.

The first extension portion 401A extends on one side in the array direction with respect to the plurality of pressure chambers 12, specifically, in the X axis direction that is the intersecting direction at a position on the −Y direction side. In the present embodiment, the first extension portion 401A includes a first extension part 401A1 electrically coupled to the wiring portion 93*a* and a first extension part 401A2 electrically coupled to the wiring portion 93*b*. The second extension portion 401B extends in the Y axis direction, which is the array direction. In the present embodiment, the second extension portion 401B includes a second extension part 401B1 continuous with the first extension part 401A1 and a second extension part 401B2 continuous with the first extension part 401A2. The third extension portion 401C extends on the other side in the array direction with respect to the plurality of pressure chambers 12, specifically, in the X axis direction that is the intersecting direction at a position on the +Y direction side. In the present embodiment, the third extension portion 401C continuously extends from the second extension portion 401B and electrically couples the second extension part 401B1 to the second extension part 401B2.

As illustrated in FIGS. 6 and 7 as an example, the detecting resistor 401 is disposed so as to extend through the vicinity of the ink flow paths in the pressure chamber substrate 10. In the present embodiment, the second extension portion 401B of the detecting resistor 401 is disposed so as to extend on the −Z direction side of the throttling portion 13 present near each of the pressure chambers 12, while the vibration plate 50 is interposed between the second extension portion 401B and the throttling portion 13. In the example illustrated in FIG. 4, the second extension portion 401B of the detecting resistor 401 alternately extends toward one side and the other side in the array direction a plurality of times. That is, the second extension portion 401B of the detecting resistor 401 is formed as a so-called meander pattern. Since the second extension pattern 401B that easily contributes to the detection of the temperature is configured in the above-described manner, it is possible to improve the accuracy of detecting the temperature of the ink within the pressure chambers 12 by the detecting resistor 401. However, for example, the second extension portion 401B of the detecting resistor 401 may be formed as a meander pattern so as to alternately extend toward one side and the other side in the intersecting direction, instead of the array direction. Alternatively, the second extension portion 401B of the detecting resistor 401 may be formed in any shape such as a linear shape, instead of the meander pattern, for example.

The material of the detecting resistor 401 has an electrical resistance value indicating temperature dependency. For example, as the material of the detecting resistor 401, gold (Au), platinum (Pt), iridium (Ir), aluminum (Al), copper (Cu), titanium (Ti), tungsten (W), nickel (Ni), chromium (Cr), and the like can be used. Among them, platinum (Pt) is suitable as the material of the detecting resistor 401 since a change in electrical resistance of platinum due to the temperature is large and the stability and the precision of platinum are high.

As illustrated in FIG. 7, in the present embodiment, the detecting resistor 401 is formed in the same layer as that of the first electrodes 60 in the stacking direction and is not electrically continuous with the first electrodes 60. In the present embodiment, the detecting resistor 401 is formed together with the first electrodes 60 in a process of forming the first electrodes 60. That is, the detecting resistor 401 is made of platinum (Pt) that is the same material as that of the first electrodes 60. The detecting resistor 401 has a thickness of approximately 80 nanometers, like the first electrodes 60. However, the detecting resistor 401 is not limited thereto. The detecting resistor 401 may be separately formed from the first electrodes 60 and may be formed in a layer different from the layer in which the first electrodes 60 are formed.

Heat dissipation from the detecting resistor 401 may be suppressed in order to suppress a reduction in the accuracy of detecting the temperature. As illustrated in FIG. 7, in the present embodiment, a low-thermal conductive layer 402 is further stacked on an upper portion of the detecting resistor 401. Specifically, the low-thermal conductive layer 402 is disposed on the surface of the detecting resistor 401 on the side opposite to the surface of the detecting resistor 401 facing the pressure chamber substrate 10. That is, the low-thermal conductive layer 402 is disposed on the surface of the detecting resistor 401 on the −Z direction side. The low-thermal conductive layer 402 has a lower thermal conductivity than that of the detecting resistor 401.

As illustrated in FIG. 8, the low-thermal conductive layer 402 may be made of a conductive material such as metal so that the measurement lead electrode 93 is easily electrically coupled to the upper portion of the detecting resistor 401 through the contact hole 93H. By disposing the layer with the low thermal conductivity on the surface of the detecting resistor 401 on the side opposite to the surface of the detecting resistor 401 facing the pressure chamber substrate 10, it is possible to suppress dissipation of heat transmitted from the ink within the pressure chambers 12 to the detecting resistor 401 from the surface of the detecting resistor 401 on the side opposite to the surface of the detecting resistor 401 facing the pressure chamber substrate 10. The low-thermal conductive layer 402 may have a large thickness sufficient to reliably suppress heat dissipation from the detecting resistor 401. The low-thermal conductive layer 402 may not be in contact with the detecting resistor 401. For example, an adhesion layer made of iridium (Ir) or the like to improve the adhesion of the detecting resistor 401 to the low-thermal conductive layer 402 may be disposed between the detecting resistor 401 and the low-thermal conductive layer 402. The low-thermal conductive layer 402 may be omitted. In the following description, the description of the configuration of the low-thermal conductive layer 402 is omitted unless otherwise specifically noted.

Figure 9:
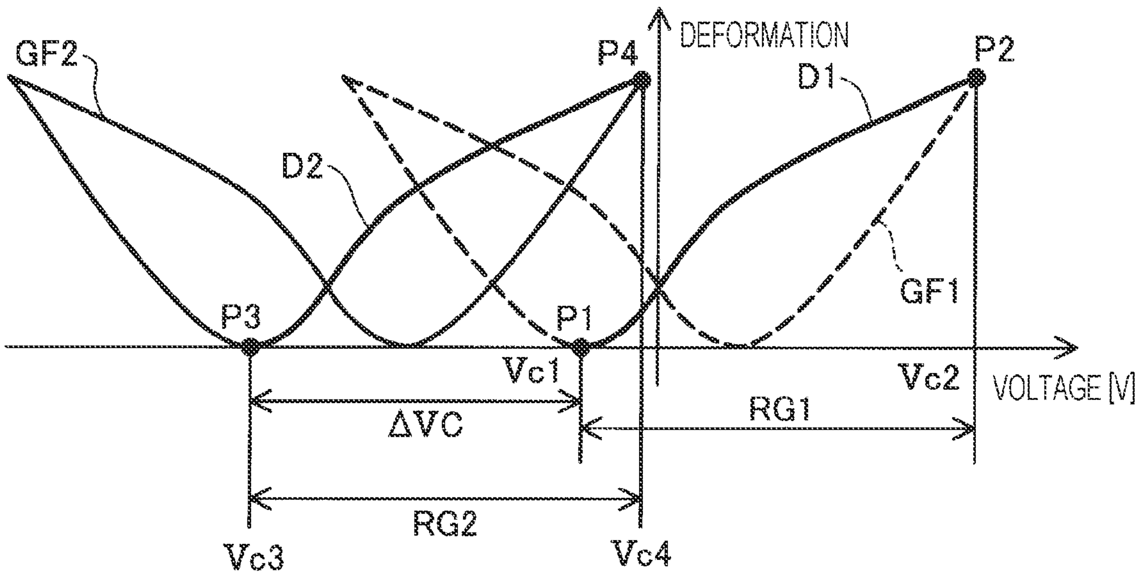
FIG. 9 is an explanatory diagram illustrating an example of deformation characteristics of a piezoelectric body.

FIG. 9 is an explanatory diagram illustrating an example of deformation characteristics of the piezoelectric body 70. FIG. 9 illustrates a graph with a horizontal axis indicating the voltage and a vertical axis indicating the deformation of the piezoelectric body 70. As illustrated in FIG. 9, the deformation of the piezoelectric body 70 forms a predetermined hysteresis loop with respect to a change in the voltage due to a so-called inverse piezoelectric effect.

A graph GF1 indicated by a broken line in FIG. 9 indicates deformation characteristics of the piezoelectric body 70 immediately after the manufacturing of the liquid ejecting apparatus 500. Immediately after the manufacturing, the head controller 520 adjusts a drive voltage to be applied to the first electrodes 60 and applies, to the piezoelectric body 70, a voltage in a range RG1 from a voltage Vc1 to a voltage Vc2 higher than the voltage Vc1. As a result, immediately after the manufacturing, the amount of deformation of the piezoelectric body 70 varies in a range from a deformation amount indicated by a plotted point P1 to a deformation amount indicated by a plotted point P2 as indicated by a solid line D1 of the graph GF1. For example, the hysteresis loop may be shifted toward the low voltage side due to a predetermined condition such as an increase in the number of times of the driving.

A graph GF2 indicated by a solid line in FIG. 9 indicates an example of deformation characteristics of the piezoelectric body 70 changed by giving a predetermined condition to the piezoelectric body 70 immediately after the manufacturing. In the piezoelectric body 70 with the changed deformation characteristics, the hysteresis loop is shifted toward the low voltage side by a voltage ΔVC. In this case, even when a voltage in the above-described range RG1 is applied to the piezoelectric body 70, sufficient deformation characteristics of the piezoelectric body 70 are not obtained. Therefore, as indicated by a thick solid line D2 of the graph GF2, by applying, to the piezoelectric body 70, a voltage in a range RG2 from a voltage Vc3 lower by the voltage ΔVC than the voltage Vc1 to a voltage Vc4 lower by the voltage ΔVC than the voltage Vc2 and higher than the voltage Vc3, the amount of deformation of the piezoelectric body 70 can be in a range from a deformation amount indicated by a plotted point P3 to a deformation amount indicated by a plotted point P4 as a deformation amount that is the same as or close to the deformation amount of the piezoelectric body 70 immediately after the manufacturing.

Figure 10:
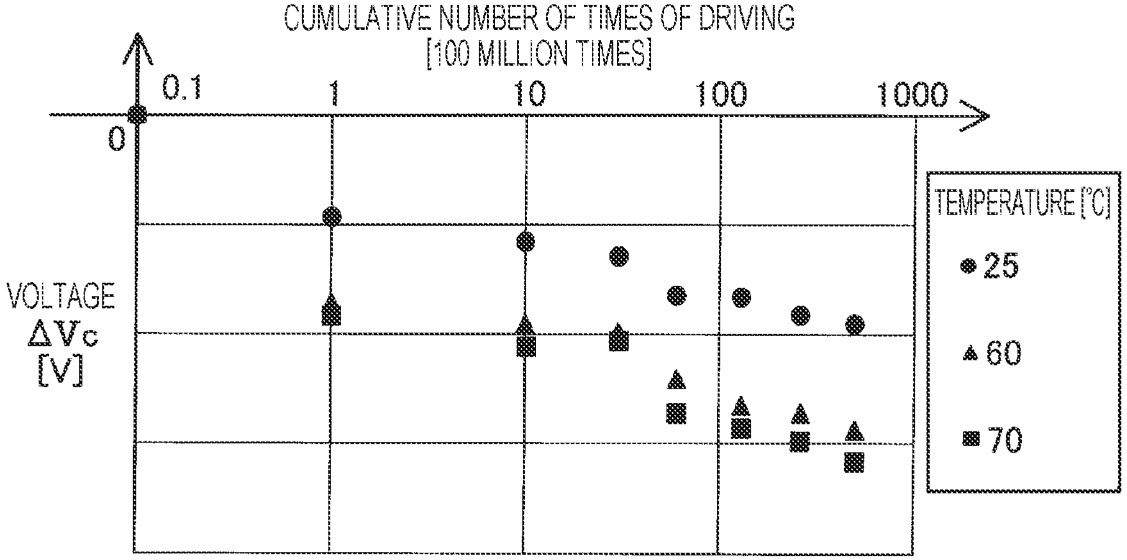
FIG. 10 is an explanatory diagram illustrating experimental results of examining a factor that affects an amount by which a voltage is shifted.

FIG. 10 is an explanatory diagram illustrating experimental results of examining a factor that affects the voltage ΔVC. In FIG. 10, a vertical axis indicates the voltage ΔVC and a horizontal axis indicates the cumulative number of times of the driving of the piezoelectric elements 300. In FIG. 10, the unit of the voltage ΔVC is "V" and the unit of the cumulative number of times of the driving is "100 million times". The "cumulative number of times of the driving" means a cumulative number of times that a drive voltage is applied to the piezoelectric body 70. Instead of the cumulative number of times of the driving, information related to the cumulative number of times of the driving may be used. The "information related to the cumulative number of times of the driving" is information indirectly indicating the cumulative number of times of the driving and means information from which the cumulative number of times of the driving can be obtained. For example, the information related to the cumulative number of times of the driving may include a time period for driving the piezoelectric elements 300, a cumulative time period for applying the drive voltage to the piezoelectric body 70, a cumulative time period for applying the reference voltage to the piezoelectric body 70, and the number of times that the ink is ejected from the liquid ejecting head 510, for example.

In the present embodiment, the relationship of the voltage ΔVC with the cumulative number of times of the driving was examined for each temperature of the piezoelectric body 70. In the graph illustrated in FIG. 10, examination results obtained when the temperature of the piezoelectric body 70 is 25° C. are indicated by circular plotted points, examination results obtained when the temperature of the piezoelectric body 70 is 60° C. are indicated by triangular plotted points, and examination results obtained when the temperature of the piezoelectric body 70 is 70° C. are indicated by square plotted points. For the temperatures of the piezoelectric body 70, results obtained using results of detecting the temperatures of the piezoelectric body 70 by the detecting resistor 401 were used.

As illustrated in FIG. 10, experimental results indicated in the following (1) to (3) were obtained.

(1) When the cumulative number of times of the driving increases, the absolute value of the voltage ΔVC increases and an amount by which the hysteresis loop is shifted toward the low voltage side increases.

(2) When the temperature of the piezoelectric body 70 increases, the absolute value of the voltage ΔVC increases and an amount by which the hysteresis loop is shifted toward the low voltage side increases.

(3) When the cumulative number of times of the driving increases to a predetermined number of times or greater, the change rate of the voltage ΔVC decreases.

The inventors have newly found, from the above-described experimental results, that a deformation amount that is equal to or nearly equal to that of the piezoelectric body 70 immediately after the manufacturing can be obtained by correcting a drive waveform to be applied to the piezoelectric body 70 by the voltage ΔVC corresponding to the cumulative number of times of the driving and the temperature of the piezoelectric body 70. By reducing an effect of a change in the deformation characteristics of the piezoelectric body 70 based on the cumulative number of times of the driving and the temperature of the piezoelectric body 70, it is possible to suppress a reduction in the ink ejection performance of the liquid ejecting apparatus 500.

Figure 11:
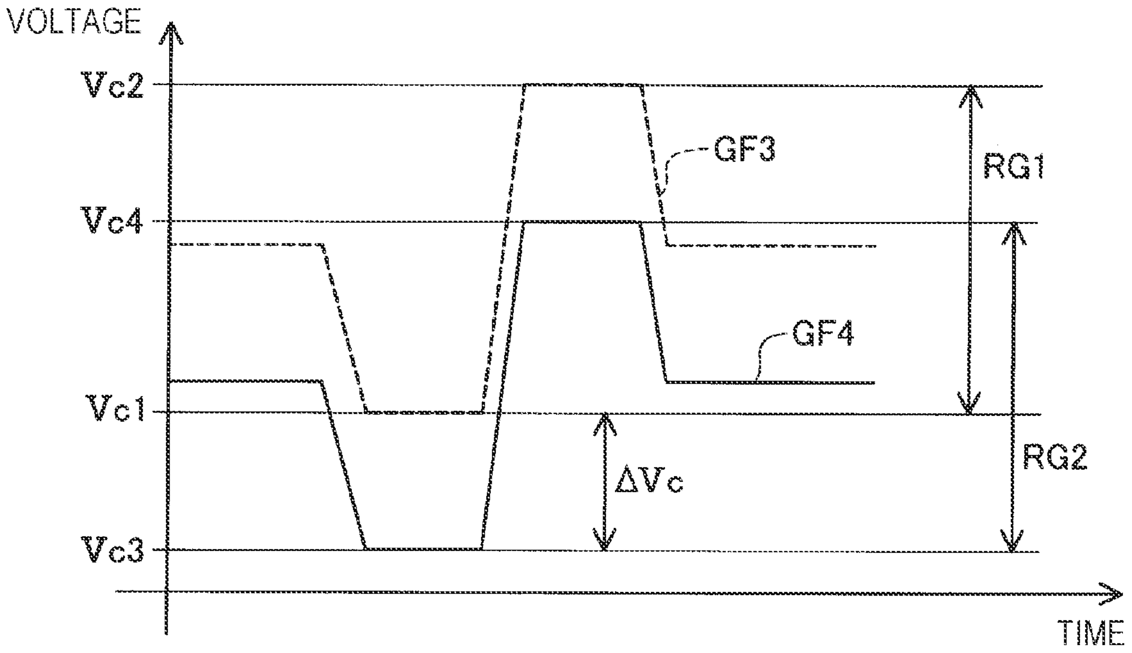
FIG. 11 is an explanatory diagram illustrating an example of a drive waveform supplied to the piezoelectric body.

FIG. 11 is an explanatory diagram illustrating an example of the drive waveform supplied to the piezoelectric body 70. FIG. 11 illustrates two drive waveforms using a horizontal axis indicating time and a vertical axis indicating the voltage. The drive waveform to be supplied to the piezoelectric body 70 is defined by the voltage difference between the drive voltage to be applied to the piezoelectric body 70 and the reference voltage to be applied to the piezoelectric body 70. In the present embodiment, any drive waveform is generated by adjusting the drive voltage on the time axis based on the reference voltage as a predetermined fixed value. A graph GF3 indicated by a broken line in FIG. 11 indicates an example of the drive waveform supplied to the piezoelectric body 70 immediately after the manufacturing. The drive waveform indicated by the graph GF3 is formed by a voltage in the above-described range RG1. A graph GF4 indicated by a solid line in FIG. 11 indicates a drive waveform corrected to be shifted toward the low voltage side by the voltage ΔVC from the drive waveform indicated by the graph GF3. The drive waveform can be shifted toward the low voltage side by adjusting the voltage difference between the drive voltage and the reference voltage.

Figure 12:
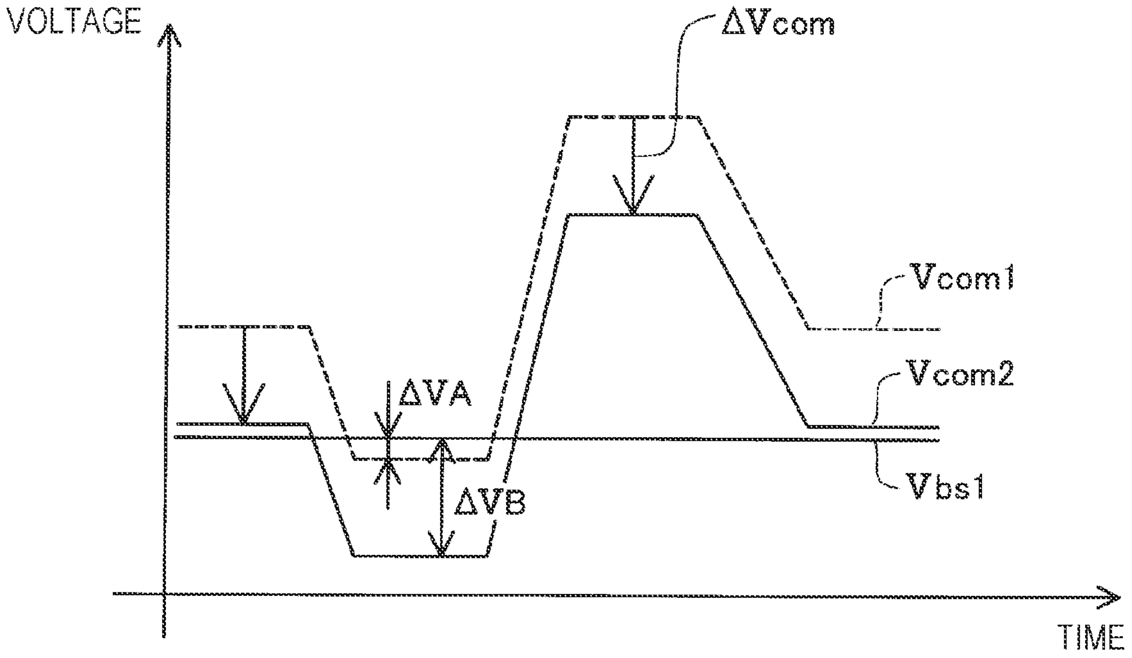
FIG. 12 is an explanatory diagram conceptually illustrating a method of correcting the drive waveform by the liquid ejecting apparatus according to the first embodiment.

FIG. 12 is an explanatory diagram conceptually illustrating a method of correcting the drive waveform by the liquid ejecting apparatus 500 according to the first embodiment. In the present embodiment, while a reference voltage Vbs1 to be applied to the second electrode 80 is fixed without being corrected, the drive waveform is shifted toward the low voltage side by correcting the value of the drive voltage to be applied to the first electrodes 60. Therefore, the reference voltage Vbs1 before the correction is equal to the reference voltage Vbs1 after the correction. On the other hand, it is possible to obtain the drive waveform after the correction indicated by the graph GF4 in FIG. 11 by applying a drive voltage Vcom2 obtained by performing correction to shift a drive voltage Vcom1 before the correction toward the low voltage side by a voltage ΔVcom. The voltage ΔVcom is substantially equal to the voltage ΔVc illustrated in FIG. 11. In the present embodiment, the shape of the waveform of the drive voltage Vcom1 is substantially the same as the shape of the waveform of the drive voltage Vcom2, and the difference between the maximum value of the drive voltage Vcom1 and the minimum value of the drive voltage Vcom1 is equal to the difference between the maximum value of the drive voltage Vcom2 after the correction and the minimum value of the drive voltage Vcom2 after the correction.

A voltage difference ΔVA illustrated in FIG. 12 is the voltage difference between the reference voltage Vbs1 and the drive voltage Vcom1 applied to the piezoelectric body 70 immediately after the manufacturing to form the drive waveform indicated by the graph GF3 in FIG. 11, that is, the drive waveform before the correction. The voltage difference between the reference voltage Vbs1 and the drive voltage Vcom1 applied to the piezoelectric body 70 immediately after the manufacturing to form the drive waveform is a voltage difference when the drive waveform is in an initial state, and is also referred to as a "reference voltage difference". A voltage difference ΔVB is a voltage difference for forming the corrected drive waveform shifted toward the low voltage side. The voltage difference ΔVB is equal to the sum of the reference voltage difference and the voltage ΔVcom as a correction value.

FIG. 13 is an explanatory diagram illustrating an example of a correction table for the drive waveform. A correction table 622A illustrated in FIG. 13 is an example of a correction table 622 stored in the storage unit 620 of the server 600 in advance. In the present embodiment, in the correction table 622A, a correction value for the drive voltage corresponding to each of conditions for the cumulative number of times of the driving and the temperature of the piezoelectric body 70 is defined. The correction table 622A is experimentally generated in advance using the examination results illustrated in FIG. 10 and the like. In the correction table 622A and a correction table 622B described later, a temperature detected by the detecting resistor 401 is used as the temperature of the piezoelectric body 70. The correction value defined in the correction table 622A corresponds to the voltage ΔVcom illustrated in FIG. 12. Therefore, when the correction value is zero, the correction value indicates that the drive waveform in the initial state based on the reference voltage difference is formed.

As illustrated in FIG. 13, the correction table 622A is set such that, when the cumulative number of times of the driving is less than 100 million times, the voltage difference between the drive voltage and the reference voltage is the reference voltage difference, that is, the correction value is zero and the piezoelectric body 70 is driven by the drive waveform in the initial state. In addition, the correction table 622A is set such that, when the voltage difference between the drive voltage and the reference voltage when the cumulative number of times of the driving is a first number of times that is any number is a first value, and the cumulative number of times of the driving is a second number of times greater than the first number of times, the voltage difference between the drive voltage and the reference voltage is a value smaller than the first value. A set value of the voltage difference between the drive voltage and the reference voltage when the cumulative number of times of the driving is the second number of times is also referred to as a "second value". In the example illustrated in FIG. 13, when the first number of times is less than 100 million times, the first value is the reference voltage difference. When the second number of times is equal to or greater than 5 billion times and less than 7 billion times, the second value is the "reference voltage difference −0.10".

In addition, the correction table 622A is set such that, when the value of the drive voltage when the cumulative number of times of the driving is the first number of times is a "first drive voltage value", and the cumulative number of times of the driving is the second number of times greater than the first number of times, the drive voltage is a value smaller than the first drive voltage value. The drive voltage when the cumulative number of times of the driving is the second number of times is also referred to as a "second drive voltage value". In other words, the correction table 622A is set such that, when the cumulative number of times of the driving increases, the absolute value of the correction value increases and the value of the drive voltage decreases. In this case, the reference voltage when the cumulative number of times of the driving is the first number of times is equal to the reference voltage when the cumulative number of times of the driving is the second number of times. Therefore, when the cumulative number of times of the driving increases, the voltage difference between the drive voltage and the reference voltage increases, and as a result, the drive waveform is shifted toward the low voltage side. The shape of the drive waveform when the cumulative number of times of the driving is the first number of times is the same as the shape of the drive waveform when the cumulative number of times of the driving is the second number of times. That is, the difference between the maximum value of the drive voltage and the minimum value of the drive voltage when the cumulative number of times of the driving is the first number of times is equal to the difference between the maximum value of the drive voltage and the minimum value of the drive voltage when the cumulative number of times of the driving is the second number of times.

The voltage computing unit 612 determines the drive voltage using the correction table 622A stored in the storage unit 620. Specifically, the voltage computing unit 612 of the server 600 acquires the temperature detected by the detecting resistor 401 and the cumulative number of times of the driving acquired by the head controller 520 as the acquirer from the liquid ejecting apparatus 500 via the communication unit 586. The voltage computing unit 612 transmits, to the liquid ejecting apparatus 500 via the communication unit 630, the drive voltage for which the correction value corresponding to the acquired temperature and the acquired cumulative number of times of the driving has been obtained using the correction table 622A. The head controller 520 of the liquid ejecting apparatus 500 acquires the drive voltage after the correction from the server 600 via the communication unit 586 and applies the drive voltage to the first electrodes 60. As a result, it is possible to supply the drive waveform after the correction to the piezoelectric body 70.

In the present embodiment, the voltage computing unit 612 performs the correction using the correction table 622A and the result of detecting the temperature by the detecting resistor 401. For example, the correction table 622A is set such that, when the cumulative number of times of the driving is the first number of times, the voltage difference between the drive voltage and the reference voltage when the temperature detected by the detecting resistor 401 is a first temperature that is any temperature is a third value, and the temperature detected by the detecting resistor 401 is a second temperature higher than the first temperature, the voltage difference between the drive voltage and the reference voltage is a fourth value equal to or larger than the third value. In the example illustrated in FIG. 13, when the first number of times is less than 100 million times, and the first temperature is 30° C. or lower, the correction value is zero. That is, the voltage difference between the drive voltage and the reference voltage is set to the reference voltage difference as an example of the third value. In addition, the correction table 622A is set such that, when the temperature detected by the detecting resistor 401 is, for example, 60° C. as the second temperature higher than the first temperature, the correction value is zero that is the same as the third value, and the voltage difference between the drive voltage and the reference voltage is the reference voltage difference as an example of the fourth value. The fourth value can be set larger than the third value.

In addition, the correction table 622A is set such that, when the cumulative number of times of the driving is the second number of times greater than the first number of times, and the voltage difference between the drive voltage and the reference voltage when the temperature detected by the detecting resistor 401 is the first temperature that is any temperature is a fifth value, and the temperature detected by the detecting resistor 401 is the second temperature higher than the first temperature, the voltage difference between the drive voltage and the reference voltage is a sixth value larger than the fifth value. In the example illustrated in FIG. 13, the correction table 622A is set such that, when the second number of times is equal to or greater than 5 billion times and less than 7 billion times, and the first temperature is 30° C. or lower, the correction value is "−0.10" and the voltage difference between the drive voltage and the reference voltage is the "reference voltage difference −0.10" as an example of the fifth value. On the other hand, the correction table 622A is set such that, when the temperature detected by the detecting resistor 401 is, for example, 60° C. as the second temperature, the correction value is −0.18 and the voltage difference between the drive voltage and the reference voltage is "the reference voltage difference −0.18" as an example of the sixth value. As described above, the correction table 622A is set such that, when the temperature detected by the detecting resistor 401 increases, the absolute value of the correction value increases and the value of the drive voltage decreases.

As described above, the liquid ejecting apparatus 500 according to the present embodiment includes the liquid ejecting head 510, the controller 580, and the head controller 520. The liquid ejecting head 510 includes the pressure chamber substrate 10, the first electrodes 60, the second electrode 80, the piezoelectric body 70, the individual lead electrodes 91, and the common lead electrode 92. The pressure chamber substrate 10 has the plurality of pressure chambers 12. The first electrodes 60 are individual electrodes individually provided for the plurality of pressure chambers 12. The second electrode 80 is a common electrode provided in common for the plurality of pressure chambers 12. The piezoelectric body 70 is disposed between the individual electrodes and the common electrode and configured to apply pressure to the ink within the pressure chambers 12. The individual lead electrodes 91 and the common lead electrode 92 are drive wirings electrically coupled to the individual electrodes and the common electrode. The controller 580 controls the ejection operation of the liquid ejecting head 510 by applying the drive voltage to the individual electrodes and applying the reference voltage to the common electrode to drive the piezoelectric body 70. The head controller 520 is an acquirer that acquires information related to the cumulative number of times of the driving of the piezoelectric body 70. The controller 580 drives the piezoelectric body such that, when the cumulative number of times of the driving is the first number of times, the voltage difference between the drive voltage and the reference voltage is the first value. The controller 580 drives the piezoelectric body such that, when the cumulative number of times of the driving is the second number of times greater than the first number of times, the voltage difference is the second value smaller than the first value. According to the liquid ejecting apparatus 500 according to this embodiment, when the cumulative number of times of the driving increases, the voltage difference between the drive voltage and the reference voltage is corrected to increase, and thus it is possible to suppress a reduction in the ejection performance due to the increase in the cumulative number of times of the driving due to the deformation characteristics of the piezoelectric body 70. Therefore, it is not necessary to perform an aging process on the piezoelectric body 70 and it is possible to extend the lifetime of the piezoelectric elements 300.

According to the liquid ejecting apparatus 500 according to the present embodiment, the controller 580 drives the piezoelectric body 70 such that, when the cumulative number of times of the driving is the first number of times, the drive voltage is the first drive voltage value. The controller 580 drives the piezoelectric body 70 such that, when the cumulative number of times of the driving is the second number of times, the drive voltage is the second drive voltage value smaller than the first drive voltage value. According to the liquid ejecting apparatus 500 according to this embodiment, it is possible to shift the drive waveform toward the low voltage side by the simple method of correcting the drive voltage and suppress a reduction in the ejection performance.

According to the liquid ejecting apparatus 500 according to the present embodiment, the controller 580 drives the piezoelectric body 70 such that the reference voltage when the cumulative number of times of the driving is the first number of times is equal to the reference voltage when the cumulative number of times of the driving is the second number of times. According to the liquid ejecting apparatus 500 according to this embodiment, it is possible to suppress a reduction in the ejection performance by the simpler method without correcting the reference voltage when the drive waveform is to be shifted toward the low voltage side.

According to the liquid ejecting apparatus 500 according to the present embodiment, the controller 580 drives the piezoelectric body 70 such that the difference between the maximum value of the drive voltage and the minimum value of the drive voltage when the cumulative number of times of the driving is the first number of times is equal to the difference between the maximum value of the drive voltage and the minimum value of the drive voltage when the cumulative number of times of the driving is the second number of times. According to the liquid ejecting apparatus 500 according to this embodiment, it is possible to maintain the shape of the drive waveform before and after the correction and reduce a difference between amounts of ink ejected before and after the correction.

The liquid ejecting apparatus 500 according to the present embodiment further includes the detecting resistor 401 that detects the temperature of the ink within the pressure chambers 12. The controller 580 drives the piezoelectric body 70 such that, when the cumulative number of times of the driving is the first number of times and the temperature detected by the detecting resistor 401 is the first temperature, the voltage difference is the third value. The controller 580 drives the piezoelectric body 70 such that, when the cumulative number of times of the driving is the first number of times and the temperature detected by the detecting resistor 401 is the second temperature higher than the first temperature, the voltage difference is the fourth value equal to or larger than the third value. The controller 580 drives the piezoelectric body 70 such that, when the cumulative number of times of the driving is the second number of times and the temperature detected by the detecting resistor 401 is the first temperature, the voltage difference is the fifth value. The controller 580 drives the piezoelectric body 70 such that, when the cumulative number of times of the driving is the second number of times and the temperature detected by the detecting resistor 401 is the second temperature, the voltage difference is the sixth value larger than the fifth value. According to the liquid ejecting apparatus 500 according to this embodiment, since the voltage difference between the drive voltage and the reference voltage is corrected according to the temperature of the piezoelectric body 70, it is possible to reduce an effect of a change in the deformation characteristics of the piezoelectric body 70 due to a change in the temperature of the piezoelectric body 70 and further suppress a reduction in the ejection performance.

According to the liquid ejecting apparatus 500 according to the present embodiment, the detecting resistor 401 is made of the same material as that of the first electrodes 60 as the individual electrodes. It is possible to form the detecting resistor 401 in the process of forming the first electrodes 60 and it is possible to simplify the manufacturing process and reduce the cost.

The liquid ejecting apparatus 500 according to the present embodiment further includes the communication unit 586. The communication unit 586 functions as a transmitter that transmits, to the server 600, the temperature detected by the detecting resistor 401 and the cumulative number of times of the driving acquired by the head controller 520 as the acquirer. The communication unit 586 functions as a receiver that receives, from the server 600, the drive voltage and the reference voltage that correspond to the temperature transmitted by the transmitter and the cumulative number of times of the driving transmitted by the transmitter. According to the liquid ejecting apparatus 500 according to this embodiment, a function of calculating the correction value for the drive waveform can be provided outside the liquid ejecting apparatus 500, and the liquid ejecting apparatus 500 can be simplified.

B. Second Embodiment

Figure 14:
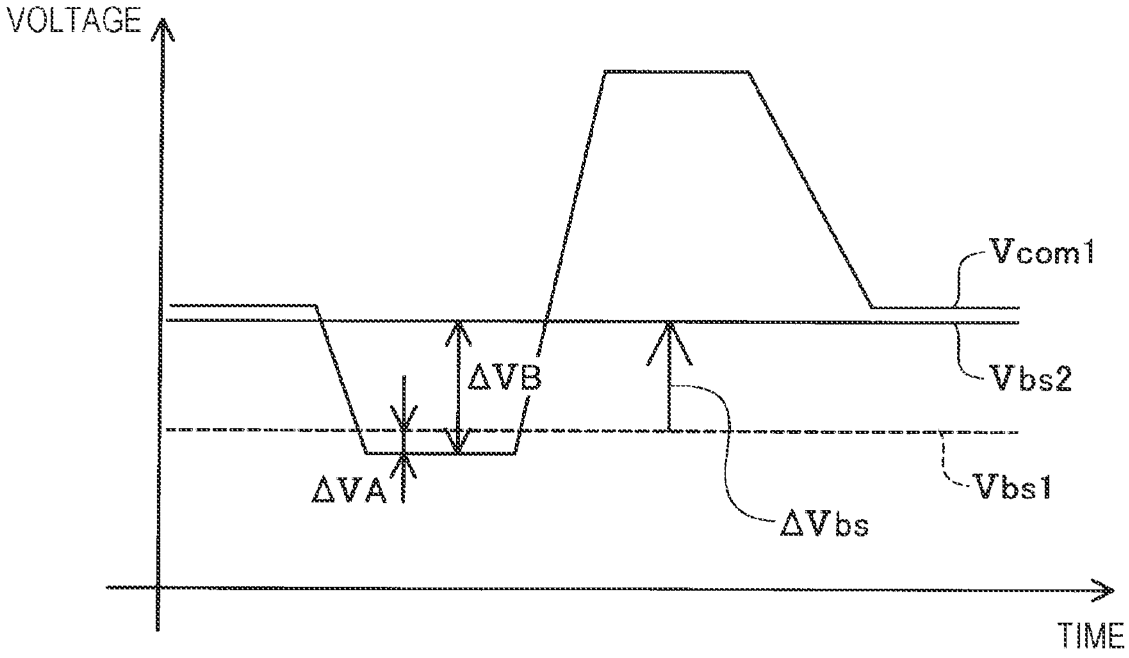
FIG. 14 is an explanatory diagram conceptually illustrating a method of correcting a drive waveform by a liquid ejecting apparatus according to a second embodiment.

FIG. 14 is an explanatory diagram conceptually illustrating a method of correcting a drive waveform by a liquid ejecting apparatus 500 according to a second embodiment. In the present embodiment, the drive waveform is shifted toward the low voltage side by correcting a reference voltage to be applied to a second electrode 80 while a drive voltage Vcom1 to be applied to first electrodes 60 is maintained at a fixed level without being corrected. Therefore, the drive voltage Vcom 1 before the correction is equal to the drive voltage Vcom 1 after the correction. On the other hand, as illustrated in FIG. 14, the drive waveform after the correction indicated by the graph GF4 in FIG. 11 can be obtained by applying a reference voltage Vbs2 obtained by correcting a reference voltage Vbs1 before the correction to shift the reference voltage Vbs1 toward the high voltage side by a voltage ΔVbs. The voltage ΔVbs is substantially equal to the voltage ΔVc illustrated in FIG. 11.

A voltage difference ΔVA illustrated in FIG. 14 is the voltage difference between the reference voltage Vbs1 and the drive voltage Vcom1 applied to a piezoelectric body 70 immediately after the manufacturing to form the drive waveform indicated by the graph GF3 in FIG. 11, that is, the drive waveform before the correction. The voltage difference ΔVA is a reference voltage difference. A voltage difference ΔVB is a voltage difference for forming the drive waveform after the correction performed to shift the drive waveform toward the low voltage side. In this manner, the drive waveform may be shifted toward the low voltage side by correcting the reference voltage toward the high voltage side, instead of the drive voltage. Even in the liquid ejecting apparatus 500 according to this embodiment, it is possible to obtain effects similar to those obtained in the first embodiment.

FIG. 15 is an explanatory diagram illustrating a second example of a correction table for the drive waveform. In the correction table 622B, a correction value for the reference voltage corresponding to each of conditions for a cumulative number of times of driving and the temperature of the piezoelectric body 70 is defined. A method of setting the correction table 622B is the same as or similar to the above-described method of setting the correction table 622A. The absolute value of each correction value in the correction table 622B matches the absolute value of each correction value in the correction table 622A. The correction value defined in the correction table 622B corresponds to the voltage ΔVbs illustrated in FIG. 14.

As illustrated in FIG. 15, the correction table 622B is set such that, when the value of the reference voltage when the cumulative number of times of the driving is a first number of times is a "first reference voltage value", and the cumulative number of times of the driving is a second number of times greater than the first number of times, the reference voltage is a value larger than the first reference voltage value. The reference voltage when the cumulative number of times of the driving is the second number of times is also referred to as a "second reference voltage value". In other words, the correction table 622B is set such that, when the cumulative number of times of the driving increases, the absolute value of the correction value increases and the value of the reference voltage increases. In this case, the drive voltage when the cumulative number of times of the driving is the first number of times is equal to the drive voltage when the cumulative number of times of the driving is the second number of times. Therefore, when the cumulative number of times of the driving increases, the voltage difference between the drive voltage and the reference voltage increases, and as a result, the drive waveform is shifted toward the low voltage side. The shape of the drive waveform when the cumulative number of times of the driving is the first number of times is the same as the shape of the drive waveform when the cumulative number of times of the driving is the second number of times. That is, the difference between the maximum value of the reference voltage and the minimum value of the reference voltage when the cumulative number of times of the driving is the first number of times is equal to the difference between the maximum value of the reference voltage and the minimum value of the reference voltage when the cumulative number of times of the driving is the second number of times.

According to the liquid ejecting apparatus 500 according to the present embodiment, a controller 580 drives the piezoelectric body 70 such that, when the cumulative number of times of the driving is the first number of times, the reference voltage is the first reference voltage value. In addition, the controller 580 drives the piezoelectric body 70 such that, when the cumulative number of times of the driving is the second number of times, the reference voltage is the second reference voltage value larger than the first reference voltage value. According to the liquid ejecting apparatus 500 according to this embodiment, it is possible to shift the drive waveform toward the low voltage side by the simple method of correcting the reference voltage and suppress a reduction in the ejection performance.

According to the liquid ejecting apparatus 500 according to the present embodiment, the controller 580 drives the piezoelectric body 70 such that the drive voltage when the cumulative number of times of the driving is the first number of times is equal to the drive voltage when the cumulative number of times of the driving is the second number of times. According to the liquid ejecting apparatus 500 according to this embodiment, it is possible to suppress a reduction in the ejection performance by the simpler method without correcting the drive voltage when the drive waveform is to be shifted toward the low voltage side.

C. Other Embodiments (C1) The first embodiment describes the example in which the second electrode 80 as the common electrode is disposed on the upper portion of the piezoelectric body 70, and the first electrodes 60 as the individual electrodes are disposed on the lower portion of the piezoelectric body 70. However, the common electrode may be a lower electrode disposed on the lower portion of the piezoelectric body 70, and the individual electrodes may be upper electrodes disposed on the upper portion of the piezoelectric body 70. In this case, the detecting resistor 401 may be made of the same material as that of the lower electrode as the common electrode disposed on the lower portion of the piezoelectric body 70. Therefore, it is possible to form the detecting resistor 401 in a process of forming the common electrode, simplify the manufacturing process, and reduce the cost.

(C2) In the first embodiment, the material of the detecting resistor 401 is platinum (Pt) and the detecting resistor 401 is made of the same material as that of the first electrodes 60. However, the material of the detecting resistor 401 is not limited to the material of the individual electrodes. The detecting resistor 401 may be made of the same material as either the material of the common electrode or the material of the drive wirings. For example, the detecting resistor 401 may be made of the same material as that of the second electrode 80 as the common electrode. According to the liquid ejecting apparatus 500 according to this embodiment, for example, it is possible to form the detecting resistor 401 in the process of forming the second electrode 80, simplify the manufacturing process, and reduce the cost. In addition, the detecting resistor 401 may be made of the same material as that of the individual lead electrodes 91 and the common lead electrode 92 that are the drive wirings. According to the liquid ejecting apparatus 500 according to this embodiment, for example, it is possible to form the detecting resistor 401 in the process of forming the individual lead electrodes 91 and the common lead electrode 92, simplify the manufacturing process, and reduce the cost.

(C3) The first embodiment describes the example in which the correction table 622 and the voltage computing unit 612 are included in the server 600. However, the correction table 622 and the voltage computing unit 612 may be included in the controller 580 of the liquid ejecting apparatus 500. The functions of the head controller 520 and the temperature computing unit 450, the correction table 622, and the voltage computing unit 612 may be included in the liquid ejecting head 510.

(C4) Each of the embodiments describes the example in which the liquid ejecting apparatus 500 includes the detecting resistor 401. However, for example, when it is not necessary to perform the correction according to the temperature of the piezoelectric body 70, the detecting resistor 401 may not be provided. In addition, each of the embodiments describes the example in which the detecting resistor 401 is disposed in the vicinity of the pressure chambers 12 within the liquid ejecting head 510. However, the detecting resistor 401 may not be disposed in the vicinity of the pressure chambers 12 and may be located at any position within the liquid ejecting head 510.

Furthermore, the liquid ejecting apparatus 500 may include a temperature sensor that can detect the temperature of the piezoelectric body 70, instead of the detecting resistor 401 constituted by the resistance wiring. The temperature sensor may be disposed outside the liquid ejecting head 510.

D. Other Embodiments

The present disclosure is not limited to the above-described embodiments and can be implemented with various configurations without departing from the gist of the present disclosure. For example, it is possible to replace the technical features described in the embodiments and corresponding to the technical features in the aspect described in SUMMARY with other features as appropriate and combine the technical features described in the embodiments and corresponding to the technical features in the aspect described in SUMMARY as appropriate in order to solve a part or all of the above-described problems or obtain a part or all of the above-described effects. In addition, when the technical features are not described as essential features in the present specification, it is possible to remove one or more of the technical features as appropriate.

(1) According to an aspect of the present disclosure, a liquid ejecting apparatus is provided. The liquid ejecting apparatus includes a liquid ejecting head, a controller, and an acquirer. The liquid ejecting head includes a pressure chamber substrate having a plurality of pressure chambers, individual electrodes individually provided for the plurality of pressure chambers, a common electrode provided in common for the plurality of pressure chambers, a piezoelectric body disposed between the individual electrodes and the common electrode and configured to apply pressure to liquid within the pressure chambers, and a drive wiring electrically coupled to the individual electrodes and the common electrode. The controller controls an ejection operation of the liquid ejecting head by applying a drive voltage to the individual electrodes and applying a reference voltage to the common electrode to drive the piezoelectric body. The acquirer acquires information related to a cumulative number of times of the driving of the piezoelectric body. The controller controls the piezoelectric body such that, when the cumulative number of times of the driving is a first number of times, a voltage difference between the drive voltage and the reference voltage is a first value. The controller controls the piezoelectric body such that, when the cumulative number of times of the driving is a second number of times greater than the first number of times, the voltage difference is a second value smaller than the first value. According to the liquid ejecting apparatus according to this aspect, when the cumulative number of times of the driving increases, the voltage difference between the drive voltage and the reference voltage is corrected to increase.

Therefore, it is possible to suppress a reduction in ejection performance due to deformation characteristics of the piezoelectric body due to an increase in the cumulative number of times of the driving. Therefore, it is not necessary to perform the aging process on the piezoelectric body and increase the lifetime of piezoelectric elements.

(2) In the liquid ejecting apparatus according to the aspect described above, the controller may drive the piezoelectric body such that, when the cumulative number of times of the driving is the first number of times, the drive voltage is a first drive voltage value, and the controller may drive the piezoelectric body such that, when the cumulative number of times of the driving is the second number of times, the drive voltage is a second drive voltage value smaller than the first drive voltage value. According to the liquid ejecting apparatus according to this aspect, it is possible to shift a drive waveform toward the low voltage side by the simple method of correcting the drive voltage.

(3) In the liquid ejecting apparatus according to the aspect described above, the controller may drive the piezoelectric body such that the reference voltage when the cumulative number of times of the driving is the first number of times is equal to the reference voltage when the cumulative number of times of the driving is the second number of times. According to the liquid ejecting apparatus according to this aspect, it is possible to suppress a reduction in the ejection performance by the simpler method without correcting the reference voltage when the drive waveform is to be shifted toward the low voltage side.

(4) In the liquid ejecting apparatus according to the aspect described above, the controller may drive the piezoelectric body such that a difference between a maximum value of the drive voltage and a minimum value of the drive voltage when the cumulative number of times of the driving is the first number of times is equal to a difference between a maximum value of the drive voltage and a minimum value of the drive voltage when the cumulative number of times of the driving is the second number of times. According to the liquid ejecting apparatus according to this aspect, it is possible to maintain the shape of the drive waveform before and after the correction and suppress a change in an amount of ink ejected before and after the correction.

(5) In the liquid ejecting apparatus according to the aspect described above, the controller may drive the piezoelectric body such that, when the cumulative number of times of the driving is the first number of times, the reference voltage is a first reference voltage value. The controller may drive the piezoelectric body such that, when the cumulative number of times of the driving is the second number of times, the reference voltage is a second reference voltage value larger than the first reference voltage value. According to the liquid ejecting apparatus according to this aspect, it is possible to shift the drive waveform toward the low voltage side by the simple method of correcting the reference voltage and suppress a reduction in the ejection performance.

(6) In the liquid ejecting apparatus according to the aspect described above, the controller may drive the piezoelectric body such that the drive voltage when the cumulative number of times of the driving is the first number of times is equal to the drive voltage when the cumulative number of times of the driving is the second number of times. According to the liquid ejecting apparatus according to this aspect, it is possible to suppress a reduction in the ejection performance by the simpler method of correcting the drive voltage when the drive waveform is to be shifted toward the low voltage side.

(7) The liquid ejecting apparatus according to the aspect described above may further include a detecting resistor that detects a temperature of the liquid within the pressure chambers. The controller may drive the piezoelectric body such that, when the cumulative number of times of the driving is the first number of times and the temperature detected by the detecting resistor is a first temperature, the voltage difference is a third value. The controller may drive the piezoelectric body such that, when the cumulative number of times of the driving is the first number of times and the temperature detected by the detecting resistor is a second temperature higher than the first temperature, the voltage difference is a fourth value equal to or larger than the third value. The controller may drive the piezoelectric body such that, when the cumulative number of times of the driving is the second number of times and the temperature detected by the detecting resistor is the first temperature, the voltage difference is a fifth value. The controller may drive the piezoelectric body such that, when the cumulative number of times of the driving is the second number of times and the temperature detected by the detecting resistor is the second temperature, the voltage difference is a sixth value larger than the fifth value. According to the liquid ejecting apparatus according to this aspect, since the voltage difference between the drive voltage and the reference voltage is corrected according to the temperature of the piezoelectric body, it is possible to reduce an effect of a change in the deformation characteristics due to a change in the temperature of the piezoelectric body and further suppress a reduction in the ejection performance.

(8) In the liquid ejecting apparatus according to the aspect described above, the detecting resistor may be made of the same material as a material of any of the individual electrodes, the common electrode, and the drive wiring. According to the liquid ejecting apparatus according to this aspect, it is possible to form the detecting resistor in a process of forming any of the individual electrodes, the common electrode, and the drive wiring, simplify the manufacturing process, and reduce the cost.

(9) In the liquid ejecting apparatus according to the aspect described above, the common electrode may be disposed on an upper portion of the piezoelectric body and the individual electrodes may be disposed on a lower portion of the piezoelectric body.

(10) The liquid ejecting apparatus according to the aspect described above may further include a transmitter that transmits, to a server, the cumulative number of times of the driving acquired by the acquirer, and a receiver that receives, from the server, the drive voltage and the reference voltage that correspond to the cumulative number of times of the driving transmitted by the transmitter. According to the liquid ejecting apparatus according to this aspect, a function of calculating a correction value for the drive waveform can be disposed outside the liquid ejecting apparatus, and it is possible to simplify the liquid ejecting apparatus.

The present disclosure can be implemented in various forms other than the liquid ejecting apparatus. For example, the present disclosure can be implemented in forms such as the liquid ejection system, a method of manufacturing the liquid ejecting apparatus, and a method of controlling the liquid ejecting apparatus.

The present disclosure is not limited to the ink jet type and can be applied to any liquid ejecting apparatuses that eject liquid other than ink, and liquid ejecting heads used in the liquid ejecting apparatuses. For example, the present disclosure can be applied to various liquid ejecting apparatuses described below and liquid ejecting heads of the liquid ejecting apparatuses.

(1) An image recording apparatus such as a facsimile apparatus
(2) A color material ejecting apparatus to be used to manufacture a color filter for an image display apparatus such as a liquid crystal display
(3) An electrode material ejecting apparatus to be used to form an electrode of an organic electroluminescence (EL) display, an electrode of a field emission display (FED), or the like
(4) A liquid ejecting apparatus that ejects a liquid containing a bioorganic material to be used to manufacture a biochip
(5) A sample ejecting apparatus as a precision pipette
(6) An ejecting apparatus that ejects a lubricant
(7) An ejecting apparatus that ejects a resin liquid
(8) A liquid ejecting apparatus that ejects a lubricant to precision machines such as a watch and a camera with pinpoint accuracy
(9) A liquid ejecting apparatus that ejects, onto a substrate, a transparent resin liquid such as an ultraviolet curable resin liquid to form a micro hemispherical lens (optical lens) or the like to be used for an optical communication element or the like
(10) A liquid ejecting apparatus that ejects an acidic or alkaline etchant to etch a substrate or the like
(11) A liquid ejecting apparatus having a liquid consumption head that ejects any minute amount of droplets The "liquid" may be a material to be consumed by the liquid ejecting apparatus. For example, the "liquid" may be a material that is in its liquid phase. The "liquid" includes a liquid material with high or low viscosity, sol, gel, and other liquid materials such as an inorganic solvent, an organic solvent, a solution, liquid resin, and liquid metal (metal melt). In addition, the "liquid" includes not only liquid as a state of matter but also a material in which particles of a solid functional material, such as pigments or metal particles, are dissolved, dispersed, or mixed in a solvent. In addition, representative examples of the liquid are as follows.

(1) A main agent and a curing agent for an adhesive
(2) Base paint and a diluent for paint, or clear paint and a diluent
(3) A main solvent and a diluent solvent that contain cells of ink for cells
(4) A metallic leaf pigment dispersion and a diluent solvent for ink (metallic ink) having metallic luster
(5) Gasoline, light oil, and biofuel for vehicles
(6) Medicinal and protective components of a medicine
(7) A phosphor and a sealing material of a light emitting diode (LED)

What is claimed is:

1. A liquid ejecting apparatus comprising:

a liquid ejecting head including a pressure chamber substrate having a plurality of pressure chambers, individual electrodes individually provided for the plurality of pressure chambers, a common electrode provided in common for the plurality of pressure chambers, a piezoelectric body disposed between the individual electrodes and the common electrode and configured to apply pressure to liquid within the pressure chambers, and a drive wiring electrically coupled to the individual electrodes and the common electrode;

a controller that controls an ejection operation of the liquid ejecting head by applying a drive voltage to the individual electrodes and applying a reference voltage to the common electrode to drive the piezoelectric body; and an acquirer that acquires information related to a cumulative number of times of the driving of the piezoelectric body, wherein the controller drives the piezoelectric body such that, when the cumulative number of times of the driving is a first number of times, a voltage difference between the drive voltage and the reference voltage is a first value, the controller drives the piezoelectric body such that, when the cumulative number of times of the driving is a second number of times greater than the first number of times, the voltage difference is a second value smaller than the first value, the controller drives the piezoelectric body such that, when the cumulative number of times of the driving is the first number of times, the drive voltage is a first drive voltage value, the controller drives the piezoelectric body such that, when the cumulative number of times of the driving is the second number of times, the drive voltage is a second drive voltage value smaller than the first drive voltage value, and the controller drives the piezoelectric body such that a difference between a maximum value of the drive voltage and a minimum value of the drive voltage when the cumulative number of times of the driving is the first number of times is equal to a difference between a maximum value of the drive voltage and a minimum value of the drive voltage when the cumulative number of times of the driving is the second number of times.

2. The liquid ejecting apparatus according to claim 1, wherein the controller drives the piezoelectric body such that the reference voltage when the cumulative number of times of the driving is the first number of times is equal to the reference voltage when the cumulative number of times of the driving is the second number of times.

3. The liquid ejecting apparatus according to claim 1, wherein the common electrode is disposed on an upper portion of the piezoelectric body, and the individual electrodes are disposed on a lower portion of the piezoelectric body.

4. The liquid ejecting apparatus according to claim 1, further comprising:

a transmitter that transmits, to a server, the cumulative number of times of the driving acquired by the acquirer; and a receiver that receives, from the server, the drive voltage and the reference voltage that correspond to the cumulative number of times of the driving transmitted by the transmitter.

5. A liquid ejecting apparatus comprising:

a liquid ejecting head including a pressure chamber substrate having a plurality of pressure chambers, individual electrodes individually provided for the plurality of pressure chambers, a common electrode provided in common for the plurality of pressure chambers, a piezoelectric body disposed between the individual electrodes and the common electrode and configured to apply pressure to liquid within the pressure chambers, and a drive wiring electrically coupled to the individual electrodes and the common electrode;

a controller that controls an ejection operation of the liquid ejecting head by applying a drive voltage to the individual electrodes and applying a reference voltage to the common electrode to drive the piezoelectric body; and an acquirer that acquires information related to a cumulative number of times of the driving of the piezoelectric body, wherein the controller drives the piezoelectric body such that, when the cumulative number of times of the driving is a first number of times, a voltage difference between the drive voltage and the reference voltage is a first value, and the controller drives the piezoelectric body such that, when the cumulative number of times of the driving is a second number of times greater than the first number of times, the voltage difference is a second value smaller than the first value, the liquid ejecting apparatus further comprising a detecting resistor that detects a temperature of the liquid within the pressure chambers, wherein the controller drives the piezoelectric body such that, when the cumulative number of times of the driving is the first number of times and the temperature detected by the detecting resistor is a first temperature, the voltage difference is a third value, the controller drives the piezoelectric body such that, when the cumulative number of times of the driving is the first number of times and the temperature detected by the detecting resistor is a second temperature higher than the first temperature, the voltage difference is a fourth value equal to or larger than the third value, the controller drives the piezoelectric body such that, when the cumulative number of times of the driving is the second number of times and the temperature detected by the detecting resistor is the first temperature, the voltage difference is a fifth value, and the controller drives the piezoelectric body such that, when the cumulative number of times of the driving is the second number of times and the temperature detected by the detecting resistor is the second temperature, the voltage difference is a sixth value larger than the fifth value.

6. The liquid ejecting apparatus according to claim 5, wherein the detecting resistor is made of the same material as a material of any of the individual electrodes, the common electrode, and the drive wiring.

7. The liquid ejecting apparatus according to claim 5, wherein difference between the third value and the fourth value is smaller than difference between the fifth value and the sixth value.

8. The liquid ejecting apparatus according to claim 5, wherein the fourth value is equal to the third value.

9. The liquid ejecting apparatus according to claim 5, wherein the common electrode is disposed on an upper portion of the piezoelectric body, and the individual electrodes are disposed on a lower portion of the piezoelectric body.

10. The liquid ejecting apparatus according to claim 5, further comprising:

a transmitter that transmits, to a server, the cumulative number of times of the driving acquired by the acquirer; and a receiver that receives, from the server, the drive voltage and the reference voltage that correspond to the cumulative number of times of the driving transmitted by the transmitter.

* * * * *